US012105833B2

(12) United States Patent
Kress et al.

(10) Patent No.: US 12,105,833 B2
(45) Date of Patent: Oct. 1, 2024

(54) BLOCKCHAIN-BASED SUBSCRIBER DATA PROTECTION AND ACCESS

(71) Applicant: T-Mobile USA, Inc., Bellevue, WA (US)

(72) Inventors: Darren Kress, Bothell, WA (US); Ahmad Arash Obaidi, Sammamish, WA (US)

(73) Assignee: T-MOBILE USA, INC., Bellevue, WA (US)

( * ) Notice: Subject to any disclaimer, the term of this patent is extended or adjusted under 35 U.S.C. 154(b) by 845 days.

(21) Appl. No.: 16/855,924

(22) Filed: Apr. 22, 2020

(65) Prior Publication Data

US 2021/0334769 A1    Oct. 28, 2021

(51) Int. Cl.
*G06F 21/62*    (2013.01)
*G06F 21/60*    (2013.01)
(Continued)

(52) U.S. Cl.
CPC ........ *G06F 21/6245* (2013.01); *G06F 21/604* (2013.01); *G06F 21/645* (2013.01);
(Continued)

(58) Field of Classification Search
CPC ........................................... G06F 21/604–6245
See application file for complete search history.

(56) References Cited

U.S. PATENT DOCUMENTS

2012/0331567 A1 * 12/2012 Shelton ................. G06Q 10/00
726/28
2014/0090091 A1 * 3/2014 Prakash .............. G06F 21/6245
726/30
(Continued)

FOREIGN PATENT DOCUMENTS

WO    WO-2019072823 A1 * 4/2019 ......... G06F 21/6209

OTHER PUBLICATIONS

H. Oh, S. Park, G. M. Lee, H. Heo and J. K. Choi, "Personal Data Trading Scheme for Data Brokers in IoT Data Marketplaces," in IEEE Access, vol. 7, pp. 40120-40132, 2019, doi: 10.1109/ACCESS. 2019.2904248. https://ieeexplore.ieee.org/document/8664564 (Year: 2019).*

(Continued)

*Primary Examiner* — Steven S Kim
*Assistant Examiner* — Jason B Fenstermacher

(57) ABSTRACT

A data broker platform may store one or more data sharing preference settings of a subscriber for the subscriber data of the subscriber in a corresponding subscriber preference record of a subscriber preference blockchain ledger. The platform may further store one more access policy settings with respect to the subscriber data in a corresponding access configuration record of an access configuration blockchain ledger. The platform may receive a data request from a computing device of a third-party entity to access a set of subscriber data of the subscriber. Accordingly, the platform may provide the computing device of the third-party entity with access to the set of subscriber data when the platform determines using records in the subscriber preference blockchain ledger and the access configuration blockchain ledger that the third-party entity is permitted to access the set of subscriber data.

18 Claims, 9 Drawing Sheets

(51) Int. Cl.
*G06F 21/64* (2013.01)
*G06Q 20/12* (2012.01)
*H04L 9/00* (2022.01)
*H04L 9/06* (2006.01)

(52) U.S. Cl.
CPC ............ *G06Q 20/1235* (2013.01); *H04L 9/50* (2022.05); *H04L 9/0637* (2013.01); *H04L 9/0643* (2013.01); *H04L 2209/56* (2013.01)

(56) References Cited

U.S. PATENT DOCUMENTS

| | | | |
|---|---|---|---|
| 2014/0189107 A1* | 7/2014 | Kalavade | H04L 12/1859 709/224 |
| 2016/0196451 A1* | 7/2016 | Le Jouan | G06F 21/31 726/26 |
| 2017/0118352 A1* | 4/2017 | Phillip | H04M 15/705 |
| 2017/0295157 A1* | 10/2017 | Chavez | G06F 21/6218 |
| 2018/0018704 A1* | 1/2018 | Tunnell | G06Q 30/0269 |
| 2019/0370358 A1* | 12/2019 | Nation | H04L 9/50 |
| 2020/0067869 A1* | 2/2020 | Le Jouan | H04L 67/53 |
| 2020/0374106 A1* | 11/2020 | Padmanabhan | G06F 16/1837 |
| 2022/0052988 A1* | 2/2022 | Gadnis | H04L 67/104 |
| 2022/0255763 A1* | 8/2022 | Campbell | H04W 12/65 |

OTHER PUBLICATIONS

N. B. Truong, K. Sun, G. M. Lee and Y. Guo, "GDPR-Compliant Personal Data Management: A Blockchain-Based Solution," in IEEE Transactions on Information Forensics and Security, vol. 15, pp. 1746-1761, 2020, doi: 10.1109/TIFS.2019.2948287. https://ieeexplore.ieee.org/document/8876647 (Year: 2019).*

* cited by examiner

BLOCKCHAIN-BASED SUBSCRIBER DATA PROTECTION AND ACCESS

BACKGROUND

Consumers are becoming more comfortable with the idea of sharing their online activities and behavior information with advertisers and retailers. Mobile network operators (MNOs) may at times share subscriber data of subscribers who have consented to data sharing with third-party entities, including third-party advertisers and retailers. For example, the subscriber data may include call detail records (CDRs), subscriber geolocation information, timelines of subscriber geolocations, user device information, and/or other subscriber data with third-party entities. In turn, these third-party entities may use the subscriber data to identify subscriber travel patterns, product and service preferences, device usage trends, etc. for various subscribers. Accordingly, the third-party entities may identify products and services that are of potential interest to the subscribers of the MNO.

BRIEF DESCRIPTION OF THE DRAWINGS

The detailed description is described with reference to the accompanying figures, in which the left-most digit(s) of a reference number identifies the figure in which the reference number first appears. The use of the same reference numbers in different figures indicates similar or identical items.

DETAILED DESCRIPTION

Figure 1:
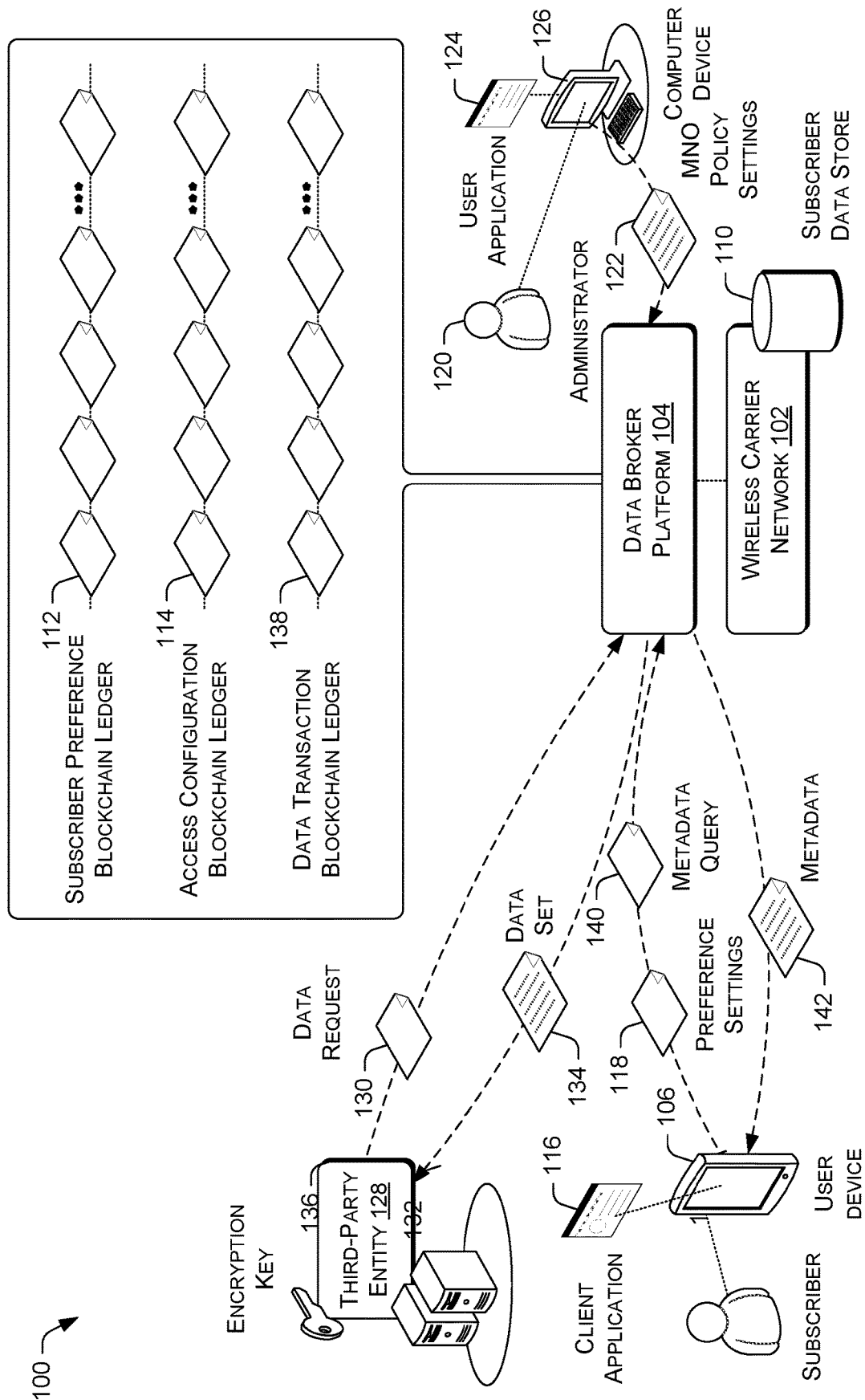
FIG. 1 illustrates an example architecture for a mobile network operator (MNO) that operates a wireless carrier network to use blockchain technology to control third-party access to subscriber data of subscribers.

This disclosure is directed to techniques that use blockchain technology to store third-party access permissions for subscriber data that is collected by a mobile network operator (MNO). The third-party access permissions may allow third-party entities that have relationships with the MNO to access the subscriber data of particular subscribers that receive telecommunication services from a wireless carrier network that is operated by the MNO. For example, the third-party entities may include third-party advertisers and retailers. The particular subscribers may be a subset of the subscribers that have consented to the sharing of their data with the third-party entities. The subscriber data of a subscriber may include call data records (CDRs), subscriber geolocation information, timelines of subscriber geolocations, user device information, and/or other subscriber data that may be of interest to the third-party entities. In some instances, the third-party entities may analyze the subscriber data of the subscribers to offer products and services to the subscribers. In other instances, the third-party entities may analyze the subscriber data to ascertain generalized patterns and trends, such as those related to demographics, consumption habits, socioeconomic factors, vehicle traffic, etc.

In various embodiments, a blockchain-enabled data broker platform of the MNO may use multiple blockchain ledgers to control third-party entity access to subscriber data. These blockchain ledgers may include a subscriber preference blockchain ledger and an access configuration blockchain ledger. The subscriber preference blockchain ledger may store the data sharing preference settings that are inputted by the individual subscribers of the MNO. For example, the data sharing preference settings inputted by a subscriber may identify the type of subscriber data that are allowed to be shared, the business classifications or identifiers of the third-party entities that are allowed to access the shared subscriber data, one or more allowed usage purposes for the shared subscriber data, the time duration for the sharing and use of the subscriber data, etc. The data sharing preference settings inputted by each subscriber are stored in a corresponding subscriber preference record of the subscriber preference blockchain ledger.

The access configuration blockchain ledger may store access policy settings of the MNO for controlling third-party access to the subscriber data of the subscribers. The access policy settings may be developed based on the business relationships of the MNO with various third-party entities, governmental regulations, privacy laws and standards, etc. The access policy settings stored in an access configuration record of the access configuration blockchain ledger may pertain to one or more subscribers of the MNO. For example, the access policy settings stored in an access configuration record may limit access for subscriber data of one or more subscribers to certain type of third-party entities, to specific identified third-party entities, to third-party entities in specific geographical areas, specific business sectors, meeting specific business practice requirements, and/or so forth. Accordingly, a third-party entity is permitted to access a set of subscriber data belonging to a particular subscriber when permission settings stored in both the subscriber preference blockchain ledger and the access configuration blockchain ledger permit such access by the third-party entity. In some instances, the access policy settings stored in an access configuration record may also dictate whether a particular subscriber has the ability to perform specific actions on the underlying subscriber data of the particular subscriber, such as deleting the subscriber data.

In some embodiments, an additional data transaction blockchain ledger of the data broker platform may contain data transaction records that store transaction information for each subscriber data access by a third-party entity to the subscriber data of individual subscribers. For example, the transaction information stored in a data transaction record for a subscriber data access may indicate an identity of the third-party entity that accessed subscriber data, the time and date of subscriber data access, the identifier of each subscriber to which the accessed subscriber data belongs, the type of the subscriber data that is accessed, the identification information of the subscriber data that is accessed, the type and amount of the financial compensation provided to each subscriber for the access to the subscriber data, and/or so forth.

In additional embodiments, the data broker platform may include a marketplace function that assists subscribers in monetizing their subscriber data to the third-party entities. In such embodiments, the marketplace function may determine the value for a set of subscriber data that belongs to a subscriber. For example, the marketplace function may make the determination based on the identity of the subscriber, the demographic information of the subscriber, the type of subscriber data for potential sharing, and/or so forth. Subsequently, when the subscriber agrees to share the subscriber data in exchange for a particular value, the marketplace function may match the subscriber to a third-party entity that is willing to pay at least the particular value. The particular value that is provided by the third-party entity to the subscriber may take many forms. For example, the value that is provided may be in the form of real-world monetary compensation, virtual currency compensation, discounts to products and/or services, statement credit, and/or so forth.

By using these blockchain ledgers, the MNO may ensure that third-party access to subscriber data is always in compliance with the preferences of the subscribers, the internal policies of the MNO, and applicable government regulations. Also, since each data access is recorded in a blockchain ledger that cannot be easily tampered with, a subscriber is always able to access the blockchain ledger to find out with whom and when their data is shared by the MNO. In some cases, the ability to easily access such information may ease the concerns of subscribers and motivate them to provide their data to third-party entities for financial compensation that offsets the cost of their wireless service. Further, the blockchain ledgers can also be audited by both private and governmental regulatory bodies to ensure MNO compliance with privacy obligations and laws. The techniques described herein may be implemented in a number of ways. Example implementations are provided below with reference to the following figures.

Example Architecture

FIG. 1 illustrates an example architecture 100 for a mobile network operator (MNO) that operates a wireless carrier network to use blockchain technology to control third-party access to subscriber data of subscribers. The architecture 100 may include a wireless carrier network 102 that is operated by an MNO and a data broker platform 104 that is controlled by the MNO. The wireless carrier network may provide a wide range of mobile communication services, as well as ancillary services and features, to subscribers and associated mobile device users. The wireless carrier network may be implemented using multiple interconnected networks. In various embodiments, the wireless carrier network may include multiple Radio Access Networks (RANs). The RANs may be connected to each other via regional ground networks. In turn, the regional ground networks may be connected to a core network by a wide area network (WAN). Each regional portion of the wireless carrier network may include one or more RANs and a regional circuit and/or packet-switched network and associated signaling network facilities. The wireless carrier network may provide telecommunication and data communication in accordance with one or more technical standards, such as Enhanced Data Rates for GSM Evolution (EDGE), Wideband Code Division Multiple Access (W-CDMA), High-Speed Packet Access (HSPA), Long Term Evolution (LTE), CDMA-2000 (Code Division Multiple Access 2000), and/or so forth. In some embodiments, the core network of the wireless carrier network may be accessed via wired or wireless local area networks (LANs). For example, a wireless local area network may be a network that is established using Wi-Fi or Bluetooth standards and hardware. In various embodiments, the wireless carrier network may provide telecommunication services to user devices, such as the user device 106 of the subscriber 108. The user devices may include mobile handsets, smartphones, routers, home smart devices, vehicle smart devices, tablet computers, personal digital assistants (PDAs), smartwatches, and/or electronic devices.

The subscriber data store 110 of the wireless carrier network 102 may store the subscriber data of subscribers. The subscriber data for each subscriber may be obtained from multiple sources, such as network information data sources, device information data sources, and user account data sources. In various embodiments, the subscriber data stored in subscriber data store 110 may be collected from the multiple sources with the consent of the subscribers. For example, a subscriber may provide or revoke their consent for specific subscriber data collection by navigating to a web portal operated by the wireless carrier network 102 via a web browser. In other embodiments, subscribers may use a selection menu accessible via applications on user devices to consent to the collection of specific subscriber data collection, in which the consent opt-in or consent opt-out choices that are submitted via the application are eventually reported to the wireless carrier network 102. For example, the web portal or the selection menu may include checkboxes that the subscriber can select or de-select in order to opt-in or opt-out of specific subscriber data collections.

The data sources that provide subscriber data to the subscriber data store 110 may include network and database tools that monitor, generate, and/or store data related to the operation status and functionalities of the wireless carrier network 102. The network and database tools may be supervised by teams of personnel that support the operations of the wireless carrier network 102. The network information data sources may provide network data for storage in the subscriber data store 110. In some embodiments, the network data may include communication logs (e.g., a CDR) regarding the communication sessions of subscribers, in which the communication sessions may include telephone calls, messaging sessions, web browsing sessions, and/or other data connectivity sessions. For example, with respect to a telephone call, the communication logs may provide data such as a time and date of the call, a duration of the call, an identifier of each network cell that is connected to during the call, a subscriber identifier associated with the telephone call, a device identifier of the device that is used to make the telephone call, and/or so forth. With respect to a messaging session, the communication logs may provide data such as the time and date of message transmissions during the messaging session, the message size of each message, type of message (e.g., text message, Rich Communication Services (RCS) message, Multimedia Messaging Service (MMS) message, etc.), an identifier of each network cell that is connected to for each message, a subscriber identifier associated with the messages, a device identifier of the device that is used to send or receive messages, and/or so forth.

For a web browsing session or a data connectivity session, the communication logs may include data such as the time and date of the session, the duration of the session, the amount of data uploaded and/or downloaded during the session, an identifier of each network cell that is connected to for the session, a subscriber identifier associated with the session, a device identifier of the device that is used for the session, and/or so forth. In some instances, the network data may also include information regarding the technical and operational status of the wireless carrier network 102. For example, the network data may indicate that Long-Term Evolution (LTE) spectrum coverage (or other spectrum coverage) is unavailable in a particular geographical area during a certain time, or that a network cell was temporarily overwhelmed with network traffic at a particular time due to a major event.

The device information data sources may provide the subscriber data store 110 with device data regarding the user devices of subscribers. The device data may indicate the brand, manufacturer, model, technical capabilities, feature settings, and operational statuses of user devices. For example, device data for a particular user device may indicate that Wi-Fi calling is enabled on the user device or that the user device is capable of using a specific communication band provided by the wireless carrier network 102. In other examples, the device data for the particular user device may indicate that Wi-Fi calling is disabled on the user device, a developer mode is active on the user device, a location tracking service is active on the user device, and/or so forth.

Furthermore, the subscriber data store 110 may store account data collected from the user account data sources. The user account data sources may store the account details of multiple subscribers, such as account type (e.g., pre-paid or postpaid), billing preferences, service plan subscription, payment history, data consumed for each time period, minutes of talk time used for each time period, and/or so forth of each subscriber. For example, the account data of a particular subscriber may indicate that the subscriber has a postpaid account, and that the subscriber is current with payments for the subscribed service plan.

In some instances, the subscriber data store 110 may further store data collected from one or more third-party data sources. Each third-party data source may be a database that is provided by a party other than the wireless carrier network 102. For example, a third-party database may be provided by a third-party vendor, a third-party contractor, a government entity, another telecommunication carrier, and/or so forth. Each third-party data source may contain additional external data, such as network-related information, device-related information, and/or user-related information, that supplement the information stored in the subscriber data store 110 for each subscriber.

The data broker platform 104 may use multiple blockchain ledgers to control third-party entity access to the subscriber data stored in the subscriber data store 110. These blockchain ledgers may include a subscriber preference blockchain ledger 112 and an access configuration blockchain ledger 114. The subscriber preference blockchain ledger 112 may store the data sharing preference settings that are inputted by the individual subscribers of the MNO. In various embodiments, the data broker platform 104 may provide an online preference portal that enables subscribers to input the data sharing preference settings for their subscriber data. A subscriber may interface with the online preference portal via a client application on a user device. For example, the subscriber 108 may use the client application 116 on the user device 106 to send the preference settings 118 to the data broker platform 104 via the online preference portal. The client application may be a web browser, a custom user application provided by the wireless carrier network 102, or some other resident application. Accordingly, a subscriber may use the online preference portal to configure and send the corresponding data sharing preference settings to the data broker platform 104. For example, the data sharing preference settings inputted by a subscriber may identify the type of subscriber data that are allowed to be shared, the business classifications or identifiers of the third-party entities that are allowed to access the shared subscriber data, one or more allowed usage purposes for the shared subscriber data (e.g., marketing, research, advertising, etc.), the time duration for the sharing of the subscriber data, etc. The data sharing preference settings inputted by each subscriber are stored as metadata in a corresponding subscriber preference record of the subscriber preference blockchain ledger.

The access configuration blockchain ledger 114 may store metadata in the form of access policy settings for controlling third-party access to the subscriber data stored in the subscriber data store 110. The access policy settings may be developed based on the business relationships of the MNO with various third-party entities, governmental regulations, privacy laws and standards, etc. In various embodiments, the data broker platform 104 may provide an online administrative portal that enables an administrator 120 of the wireless carrier network 102 to input the access policy settings 122. The administrator 120 may interface with the online administrative portal via a user application 124 on a computer device 126. The user application 124 may be a web browser, a custom administrative application provided by the wireless carrier network 102, or some other resident application. The access policy settings stored in each access configuration record of the access configuration blockchain ledger 114 may pertain to one or more subscribers of the MNO. For example, the access policy settings stored in an access configuration record may limit access for subscriber data of one or more subscribers to a certain type of third-party entities, to specific identified third-party entities, to third-party entities in specific geographical areas, specific business sectors, meeting specific business practice requirements, and/or so forth.

In various embodiments, a third-party entity, such as the third-party entity 128, may send a data request 130 to the data broker platform 104. For example, the third-party entity 128 may use a computing device 132 to send third-party authentication credentials to an online data retrieval portal of the data broker platform 104. Following validation of the third-party authentication credentials, the online data retrieval portal may permit the third-party entity 128 to submit the data request 130. The data request 130 may specify one or more request parameters of a particular set of subscriber data that the third-party entity 128 desires to access. The request parameters may include one or more subscriber identifier parameters (e.g., a subscriber identifier or a range of subscriber identifiers), one or more subscriber demographic parameters, one or more geolocation parameters, one or more time and date parameters, one or more user device parameters, one or more subscriber account parameters, and/or so forth. The data request 130 may further include entity parameters that pertain to the third-party entity 128, such as an identifier of the third-party entity 128, a business classification of the third-party entity, a stated usage purpose for the requested data, and/or so forth.

Accordingly, a data retrieval function of the data broker platform 104 may identify subscriber data of particular subscribers in the subscriber data store 110 that matches the one or more request parameters of the data request 130. The data retrieval function then reads the subscriber preference blockchain ledger 112 and the access configuration blockchain ledger 114 to identify a set of one or more subscribers of the particular subscribers for which subscriber data can be shared with the third-party entity 128. For example, the data retrieval function may determine that the data sharing preferences of a subscriber permits that sharing of the corresponding subscriber data with the third-party entity 128 when a business classification of the entity matches a business classification permitted in the preference settings, and a data usage purpose stated by the entity matches a purpose permitted in the preference settings. Likewise, the data retrieval function may determine that the access policy settings pertaining to the subscriber allows the sharing of the subscriber data of the subscriber with the entity when the third-party entity 128 is not barred from receiving the data due to legal, geographical, and/or business restrictions set forth in the access policy settings. The data set 134 of subscriber data that belong to the identified set of one or more subscribers are sent by the data broker platform 104 to the third-party entity 128 in response to the data request 130. The data set 134 may be encrypted by the data broker platform 104 such that the data set 134 is accessible to the third-party entity 128 following a decryption of the data set 134 with a valid encryption key 136 provided by the data broker platform 104. For example, the data set 134 may be encrypted via symmetric encryption or asymmetric encryption. Accordingly, the third-party entity 128 is permitted to access the set of subscriber data belonging to a particular subscriber when permission settings stored in both the subscriber preference blockchain ledger 112 and the access configuration blockchain ledger 114 permit such access by the third-party entity.

In some embodiments, the data broker platform 104 may use a data transaction blockchain ledger 138 to track third-party entity access to the subscriber data stored in the subscriber data store 110. The data transaction blockchain ledger 138 may contain data transaction records that store data transaction information as metadata for each subscriber data access by a third-party entity to the subscriber data of individual subscribers. For example, the data transaction information stored in a data transaction record for a subscriber data access may indicate an identity of the third-party entity, the time and date of subscriber data access, the identifier of each subscriber to which the accessed subscriber data belongs, the type of the subscriber data that is accessed, the identification information of the subscriber data that is accessed, the type and amount of financial or other compensation provided to each subscriber for the access to the subscriber data, and/or so forth.

In additional embodiments, a subscriber may use a client application on a user device to request the metadata that is stored in multiple blockchain ledgers of the data broker platform 104. For example, the subscriber 108 may use the client application 116 to submit user authentication credentials (e.g., login, password, biometric information, etc.) to an online query portal of the data broker platform 104. Following the validation of the user authentication credentials by the data broker platform 104, the data broker platform 104 may permit the client application 116 to send a metadata query 140 to the online query portal. The metadata query 140 may include a subscriber identifier of the subscriber (e.g., a Mobile Station International Subscriber Directory Number (MSISDN)), International Mobile Subscriber Identity (IMSI), a subscriber account identifier, etc.) The metadata query 140 may further include one or more query parameters, such as an identifier of each blockchain ledger to be queried, the time period to be query, the type of metadata to be queried (e.g., subscriber data preference settings, access policy settings, data transactions), and/or so forth. Accordingly, a metadata query function of the data broker platform 104 may retrieve metadata 142 that matches the metadata query 140 from the subscriber preference blockchain ledger 112, the access configuration blockchain ledger 114, and/or the data transaction blockchain ledger 138. Subsequently, the metadata query function may return the metadata 142 to the client application 116.

Example Data Broker Platform Components

Figure 2:
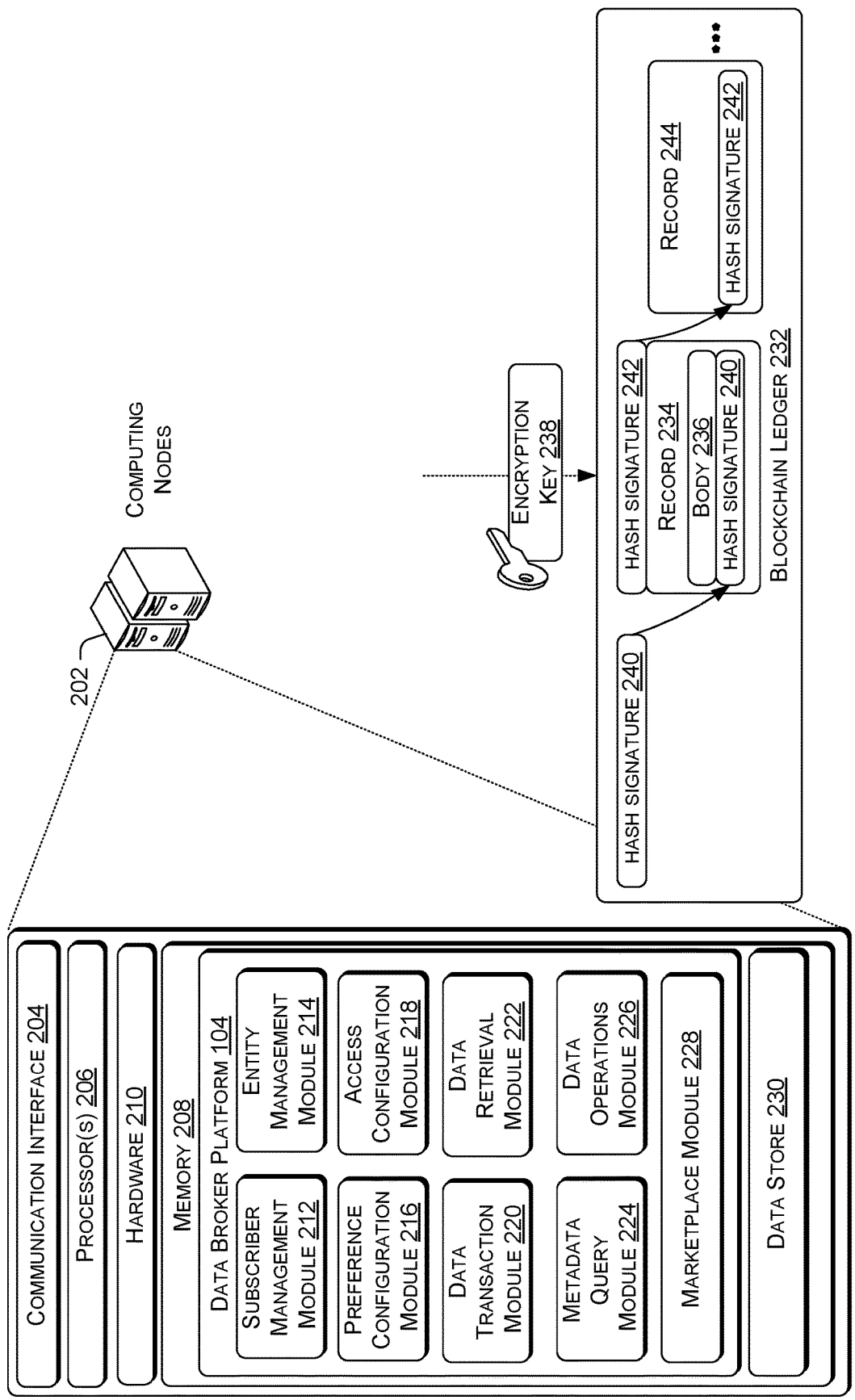
FIG. 2 is a block diagram showing various components of one or more illustrative computing nodes that enable the use of blockchain technology to control third-party access to the subscribers of subscribers.

FIG. 2 is a block diagram showing various components of one or more illustrative computing nodes that enable the use of blockchain technology to control third-party access to the subscribers of subscribers. The data broker platform 104 may be implemented by one or more computing nodes 202. The computing nodes 202 may include a communication interface 204, one or more processors 206, and memory 208. The communication interface 204 may include wireless and/or wired communication components that enable the computing nodes 202 to transmit data to and receive data from other networked devices. The computing nodes 202 may be accessed via hardware 210. The hardware 210 may include additional user interfaces, data communication, or data storage hardware. For example, the user interface may include a data output device (e.g., visual display, audio speakers), and one or more data input devices. The data input devices may include, but are not limited to, combinations of one or more of keypads, keyboards, mouse devices, touch screens that accept gestures, microphones, voice or speech recognition devices, and any other suitable devices.

The memory 208 may be implemented using computer-readable media, such as computer storage media. Computer-readable media includes, at least, two types of computer-readable media, namely computer storage media and communications media. Computer storage media includes volatile and non-volatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD), high-definition multimedia/data storage disks, or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanisms.

The data broker platform 104 may be stored in the memory 208. The data broker platform 104 may include a subscriber management module 212, an entity management module 214, a preference configuration module 216, an access configuration module 218, a data transaction module 220, a data retrieval module 222, a metadata query module 224, a data operation module 226, and a marketplace module 228. The modules may include routines, program instructions, objects, and/or data structures that perform particular tasks or implement particular abstract data types. The memory 208 may be further configured to implement a data store 230.

The subscriber management module 212 may enable subscribers, such as the subscriber 108, to authenticate to the data broker platform 104. For example, the subscriber 108 may have originally established a corresponding subscriber account by providing registration information to the wireless carrier network 102 in order to establish a subscriber account. The registration information may include a customer name, a customer address, customer contact information and/or so forth. In turn, the wireless carrier network 102 may assign authentication credentials (e.g., a login name, a password, etc.) for accessing the subscriber account. The subscriber account may also include account access information for one or more financial accounts that the subscribers provided for paying transactions and receiving refunds. The subscriber management module 212 may bootstrap the subscriber authentication mechanism of the wireless carrier network 102 to validate subscribers for providing the subscribers with access to the data broker platform 104. Accordingly, a subscriber may gain access to the online preference portal and the online query portal using the corresponding authentication credentials.

The entity management module 214 may be responsible for managing third-party access to the data broker platform 104 for the retrieval of subscriber data. Accordingly, the subscriber management module 212 may enable third-party entities to create entity accounts that are stored in the data store 230. A third-party entity may establish a corresponding entity account by providing registration information to the entity management module 214 via a user device. The registration information may include a vendor name, a business name, a business address, business contact information, authentication credentials (e.g., a login name, a password, etc.), and/or so forth. An entity account may enable a third-party entity to request subscriber data, as well as offer bids to purchase certain subscriber data. Further, an entity account may also enable a third-party to pay for the purchase of certain subscriber data via the data broker platform 104. Accordingly, the entity management module 214 may include a third-party entity authentication mechanism that validates third-party entities via corresponding authentication credentials for access to the online data retrieval portal.

The preference configuration module 216 may receive a set of data sharing preference settings of a subscriber from the online preference portal. The online preference portal may be provided by a web server or application server that interfaces with the preference configuration module 216. The preference configuration module 216 may permit the subscriber to submit the set of data preference settings after the authentication credentials of the subscriber are validated by the subscriber management module 212. The preference configuration module 216 may use blockchain technology to generate a subscriber preference record for the set of data settings and store the record in the subscriber preference blockchain ledger 112. The subscriber preference record may store the set of data sharing preference settings as metadata in a body of the record. In various embodiments, the metadata may include other information, such as the subscriber identifier of the corresponding subscriber, the date and time of the preference submission, a subscriber preference record identifier, and/or so forth. The metadata is encrypted by the preference configuration module 216 using a unique encryption key. If the subscriber preference record is a first subscriber preference record to be added to the subscriber preference blockchain ledger 112, the preference configuration module 216 may store an initial (e.g., random) signature value in the body of subscriber preference record.

However, if the subscriber preference record is any subsequent subscriber preference record, the preference configuration module 216 may store a unique cryptographic hash signature of a prior subscriber preference record of the subscriber preference blockchain ledger 112 in the body of the subscriber preference record. Subsequently, the preference configuration module 216 may direct a cryptographic hash signature to be generated for the subscriber preference record using a hash algorithm. The subscriber preference record is then added to the subscriber preference blockchain ledger 112 under the direction of the preference configuration module 216. In this way, the cryptographic hash signature of the subscriber preference record may be appended to a subsequent subscriber preference record to create a series of linked subscriber preference records as additional sets of data sharing preference settings of subscribers are received.

The access configuration module 218 may receive a set of access policy settings that pertains to one or more subscribers from the online administrative portal. The online administrative portal may be provided by a web server or application server that interfaces with the access configuration module 218. The set of access policy settings may be submitted by an administrator whose authentication credentials are validated by the online administrative portal. The access configuration module 218 may use blockchain technology to generate an access configuration record for the set of access policy settings and store the record in the access configuration blockchain ledger 114. The access configuration record may store the set of access policy settings as metadata in a body of the record. In various embodiments, the metadata may include other information, such as a user identifier of the administrator that submitted the policy settings, the date and time of the policy submission, an access configuration record identifier, and/or so forth. The metadata is encrypted by the access configuration module 218 using a unique encryption key. If the access configuration record is a first access configuration record to be added to the access configuration blockchain ledger 114, the access configuration module 218 may store an initial (e.g., random) signature value in the body of subscriber preference record. However, if the access configuration record is any subsequent access configuration record, the access configuration module 218 may store a unique cryptographic hash signature of a prior access configuration record of the access configuration blockchain ledger 114 in the body of the subscriber preference record. Subsequently, the access configuration module 218 may direct a cryptographic hash signature to be generated for the access configuration record using a hashing algorithm. The access configuration record is then added to the access configuration blockchain ledger 114. In this way, the cryptographic hash signature of the access configuration record may be appended to a subsequent access configuration record to create a series of linked access configuration records as additional sets of access policy settings are received The data transaction module 220 may receive data transaction information of a data transaction from the data retrieval module 222. A data transaction is a transaction that affects the subscriber data of one or more subscribers. In turn, the data transaction module 220 may use blockchain technology to generate a data transaction record for the data transaction information of each data transaction and store the record in the data transaction blockchain ledger 138. The data transaction record may store the data transaction information as metadata in a body of the record. In various embodiments, the metadata may include other information, such as a transaction identifier, the date and time of the data transaction information receipt, a data transaction record identifier, and/or so forth. The metadata is encrypted by the data transaction module 220 using a unique encryption key. If the data transaction record is a first data transaction record to be added to the data transaction blockchain ledger 138, the data transaction module 220 may store an initial (e.g., random) signature value in the body of subscriber preference record. However, if the access configuration record is any subsequent data transaction record, the data transaction module 220 may store a unique cryptographic hash signature of a prior data transaction record of the data transaction blockchain ledger 138 in the body of the data transaction record. Subsequently, the data transaction module 220 may direct a cryptographic hash signature to be generated for the data transaction record using a hashing algorithm. The data transaction record is then added to the data transaction blockchain ledger 138. In this way, the cryptographic hash signature of the data transaction record may be appended to a subsequent data transaction record to create a series of linked data transaction records.

The generation of a record for a blockchain ledger is further illustrated with respect to the example blockchain ledger 232. The example blockchain ledger 232 may be representative of the subscriber preference blockchain ledger 112, the access configuration blockchain ledger 114, or the data transaction blockchain ledger 138. As shown, a record 234 may contain a body 236 that stores metadata. The metadata stored in the body 236 may be encrypted by an owner of the record using an encryption key 238. The record may further store a cryptographic hash signature 240. If the record 234 is the first record in the example blockchain ledger 232, the cryptographic hash signature 240 may be an initial signature value that is generated for the example blockchain ledger 232. However, if the record 234 is any subsequent data transaction record, the cryptographic hash signature 240 may be a hash value of a prior record in the example blockchain ledger 232. In this way, the record 234 may be linked to the prior record of the blockchain ledger. The cryptographic hash signature 242 may be generated by performing a cryptographic hash of the record 234. The cryptographic hash signature 242 may be incorporated into a subsequent record 244 to link the record 234 with the subsequent record 244. In various embodiments, each of the cryptographic hash signatures may be created using a hashing algorithm (e.g., HMAC, SHA256, RSASSA-PSS, etc.). Further, records in each of the subscriber preference blockchain ledger 112, the access configuration blockchain ledger 114, or the data transaction blockchain ledger 138 may be stored in a duplicative and distributed manner across multiple computing nodes accordingly to blockchain principles, in which the computing nodes may be located at disparate geolocations. Accordingly, the depiction of the subscriber preference blockchain ledger 112, the access configuration blockchain ledger 114, and the data transaction blockchain ledger 138 in FIG. 1 are illustrative rather than limiting. This means that it is not possible to retroactively alter the records stored in any particular blockchain ledger without altering all subsequent blocks with the cooperation of a majority of the computing nodes in a distributed computing network. Accordingly, blockchain technology provides a decentralized secure data storage for storing records in a verifiable and permanent manner.

The data retrieval module 222 may receive data requests from computing devices of third-party entities via the online data retrieval portal. The online data retrieval portal may be provided by a web server or application server that interfaces with the data retrieval module 222. The entity management module 214 may be used by the data retrieval module 222 to authenticate third-party entities. A data request may specify one or more request parameters of a particular set of subscriber data that a third-party entity desires to access. Accordingly, the data retrieval module 222 may identify subscriber data of particular subscribers in the subscriber data store 110 that matches the one or more request parameters of the data request. The data retrieval module 222 then reads the subscriber preference blockchain ledger 112 and the access configuration blockchain ledger 114 to identify a set of one or more subscribers of the particular subscribers for which subscriber data can be shared with the third-party entity. In various embodiments, the data retrieval module 222 may use the preference configuration module 216 and the access configuration module 218 to locate, decrypt, and read metadata stored in the blockchain ledgers to identify the set of the one or more subscribers.

The set of subscriber data that belong to the identified set of one or more subscribers are sent by the data retrieval module 222 to the third-party entity in response to the request. The set may be encrypted by the data retrieval module 222 such that the set is accessible to the third-party entity following a decryption of the set with a valid encryption or decryption key provided separately or in advance by the data retrieval module 222. In some embodiments, the data retrieval module 222 may also report any data transaction information that is relevant to each subscriber for the data request to the data transaction module 220. In turn, the data transaction module 220 may generate one or more data transaction records for the data request.

The metadata query module 224 may receive metadata queries from user devices of subscribers via an online query portal. The online query portal may be provided by a web server or application server that interfaces with the metadata query module 224. The metadata query module 224 may permit the subscriber to submit the metadata query after the authentication credentials of the subscriber are validated by the subscriber management module 212. A metadata query submitted by a user device of a subscriber may include a subscriber identifier of the subscriber. The metadata query 140 may further include one or more query parameters, such as an identifier of each blockchain ledger to be queried, the time period to be queried, the type of metadata to be queried, and/or so forth. Accordingly, the metadata query module 224 may retrieve metadata that matches the metadata query 140 from the subscriber preference blockchain ledger 112, the access configuration blockchain ledger 114, and/or the data transaction blockchain ledger 138. Subsequently, the metadata query function may return the metadata to the user device of the subscriber. In various embodiments, the metadata may be returned as a report that presents the recorded data sharing preference settings, access configuration settings, and/or data transaction information for the subscriber.

Alternatively, the metadata query module 224 may receive metadata queries from user devices of other authorized persons. The metadata query module may permit an authorized person to submit the metadata query after the authentication credentials of the authorized person are validated by an authorized person authentication function of the data broker platform 104. The authorized persons may include enterprise employees of the MNO that operates the wireless carrier network 102, government auditors, monitors of industry groups, and/or other personnel that perform oversight, compliance, regulation, and/or carry out other official duties. Following authentication, the authorized person may submit a metadata query and receive metadata pertaining to the subscribers in a similar manner.

The data operation module 226 may receive data operation requests that are inputted by subscribers via an online operation portal. The online operation portal may be provided by a web server or application server that interfaces with the data operation module 226. A subscriber may access the online operation portal via a client application on a user device. For example, the subscriber 108 may access the online operation portal via the client application 116 on the user device 106. A data operation request may be used by the subscriber to request the performance of a data operation with respect to the subscriber data of the subscriber stored in the subscriber data store 110. For example, the data operation may involve a deletion or a modification of a set of subscriber data. Accordingly, the operation request may include several parameters, such as a subscriber identifier of the subscriber, the specific data operation to be performed, the identification information for the set of subscriber data for which the operation is to be performed (e.g., information type, time range, collection source, etc.), and/or so forth. The data operation module 226 may permit the subscriber to submit the data operation request after the authentication credentials of the subscriber are validated by the subscriber management module 212.

In turn, the data operation module 226 may read the access policy settings stored in the access configuration blockchain ledger 114 to determine whether the subscriber is permitted to perform the data operation. For example, in some instances, a subscriber may be barred from deleting certain subscriber data that pertains to the subscriber due to business rules, legal requirements, regulatory guidelines, and/or so forth. In various embodiments, the data operation module 226 may use the access configuration module 218 to locate, decrypt, and read metadata stored in the access configuration blockchain ledger 114. Thus, if the metadata in the access configuration blockchain ledger 114 indicates that the data operation can be performed, the data operation module 226 may perform the requested operation and then notify the client application of the subscriber that the operation is successfully performed. Otherwise, the data operation module 226 may send a notification to the client application indicating that the action is not permitted.

The marketplace module 228 may assist subscribers in soliciting and receiving monetary or other compensation from third-party entities in exchange for access to their subscriber data. The marketplace module 228 may use an inference framework to determine a marketplace price for a set of subscriber data of a subscriber based on one or more characteristics of the subscriber. For example, the characteristics may include gender, age, occupation, income level, education level, amount of online social influence, payment history with the wireless carrier network 102, and/or so forth. In some instances, the marketplace module 228 may make such a determination for a subscriber in response to receiving a valuation request from the subscriber via an online marketplace portal. The online marketplace portal may be provided by a web server or application server that interfaces with the marketplace module 228. For example, the subscriber 108 may use the client application 116 on the user device 106 to access the online marketplace portal. The marketplace module 228 may permit the subscriber to submit the valuation request after the authentication credentials of the subscriber are validated by the subscriber management module 212.

In various embodiments, the inference framework may apply a logical computing algorithm, a cognitive network algorithm, a machine-learning algorithm, and/or a statistic modeling algorithm to the characteristics of the subscriber to determine a marketplace price. The marketplace module 228 may obtain the characteristics of each subscriber from information stored in the subscriber data store 110, public information from social media platforms, publicly available information from government agencies and/or private reporting agencies, and/or other public information sources. In some embodiments, the marketplace price may be a monetary value, a credit value, or some other form of valuation. The credit value may indicate an amount of credit that is redeemable for products or services from the MNO of the wireless carrier network 102 or a third-party entity.

Following a determination of the marketplace value for the set of subscriber data of the subscriber, the marketplace module 228 may send a notification of the marketplace value to a client device of the subscriber via the online marketplace portal. For example, if the marketplace value is for the subscriber 108, the marketplace module 228 may send the marketplace value to the client application 116 on the user device 106. In some instances, the marketplace module 228 may receive an asking price for the set of subscriber data from the client device of the subscriber via the online marketplace portal. For example, the subscriber may have viewed the marketplace price and inputted an asking price based on the marketplace price. The asking price may be a monetary value, a credit value, or some other form of valuation. However, in other instances, a subscriber may use the online marketplace portal to submit an asking price for a set of subscriber data of the subscriber without receiving a corresponding marketplace price from the marketplace module 228. The asking price that is submitted by the subscriber may be accompanied by bid acceptance instructions. The marketplace module 228 may publish the asking price via a virtual marketplace to solicit bids from third-party entities to purchase access to the set of subscriber data. In various embodiments, the virtual marketplace is a function of the online marketplace portal that is accessible to third-party entities that are validated by the entity management module 214. The publication of the asking price may involve the marketplace module 228 sending bid solicitations to client applications on the computing devices of the third-party entities. The bid solicitations may be sent automatically to a client application of a third-party after the submission of the asking price or following a request that is submitted by the client application. Each bid solicitation may include the asking price, a description of the set of subscriber data being offered for the asking price, a time duration for inputting a bid, terms and conditions for bidding and payment, and/or other information.

Subsequently, the marketplace module 228 may receive one or more bids from third-party entities that at least match the asking price or are more than the asking price. In some embodiments, the marketplace module 228 may be configured to accept a bid based on the bid acceptance instructions provided by the corresponding subscriber. In some instances, the marketplace module 228 may automatically accept a highest bid that is submitted within a predetermined time period. In other instances, the marketplace module 228 may provide a list of the bids to the client application of the subscriber via the online marketplace portal. The list may contain the amount of the bids submitted, identification information for each third-party entity that submitted a bid, a description of each third-party entity that submitted a bid, a stated usage purpose of each third-party entity for the set of subscriber data, and/or other information. In this way, the subscriber may select one of the bids for acceptance.

Following an acceptance of a bid from a third-party entity, the marketplace module 228 may provide the third-party entity with access to the set of subscriber data in exchange for a payment that corresponds to the bid. In various embodiments, the third-party entity may use an application on a computing device to submit the payment via a payment submission function of the online marketplace portal. In turn, the marketplace module 228 may send at least a portion of the payment to an account of the subscriber. For example, the marketplace module 228 may retain a portion of the payment as a service fee for facilitating the transaction. Alternatively, the marketplace module 228 may collect a separate service fee from the third-party entity for facilitating the transaction. The payment that is provided may be in the form of real-world monetary compensation, virtual currency compensation, discounts to products and/or services, statement credit, and/or so forth.

Further, the marketplace module 228 may also automatically submit a data sharing preference setting for the set of subscriber data to the preference configuration module 216 on behalf of the corresponding subscriber. The data sharing preference setting may indicate that the subscriber has consented to share the set of subscriber data with the third-party entity. Following the payment and access to the set of subscriber data by the third-party entity, the marketplace module 228 may further submit the data transaction information pertaining to the data access to the data transaction module 220.

Example Processes

FIGS. 3-9 present illustrative processes 300-900 that are used by an MNO that operates a wireless carrier network to use blockchain technology to control third-party access to subscriber data of subscribers. Each of the processes 300-900 is illustrated as a collection of blocks in a logical flow chart, which represents a sequence of operations that can be implemented in hardware, software, or a combination thereof. In the context of software, the blocks represent computer-executable instructions that, when executed by one or more processors, perform the recited operations. Generally, computer-executable instructions may include routines, programs, objects, components, data structures, and the like that perform particular functions or implement particular abstract data types. The order in which the operations are described is not intended to be construed as a limitation, and any number of the described blocks can be combined in any order and/or in parallel to implement the process. For discussion purposes, the processes 300-900 are described with reference to the architecture 100 of FIG. 1.

Figure 3:
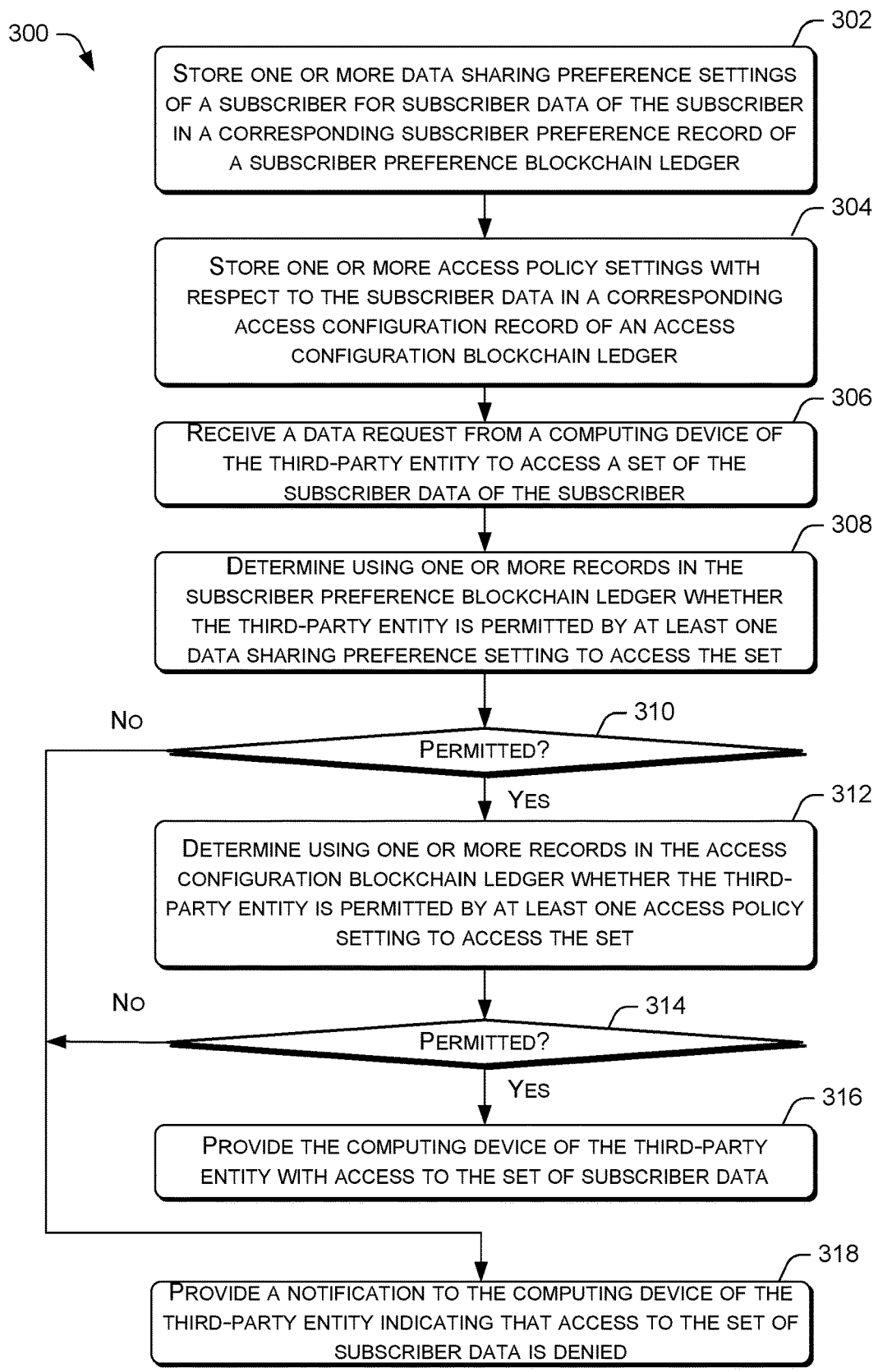
FIG. 3 is a flow diagram of an example process for providing protected third-party access to the subscriber data collected and stored by an MNO.

FIG. 3 is a flow diagram of an example process 300 for providing protected third-party access to the subscriber data collected and stored by an MNO. At block 302, the data broker platform 104 may store one or more data sharing preference settings of a subscriber for subscriber data of the subscriber in a corresponding subscriber preference record of a subscriber preference blockchain ledger 112. For example, the data sharing preference settings inputted by a subscriber may identify the type of subscriber data that are allowed to be shared, the business classifications or identifiers of the third-party entities that are allowed to access the shared subscriber data, one or more allowed usage purposes for the shared subscriber data, the time duration for the sharing of the subscriber data, etc.

At block 304, the data broker platform 104 may store one or more access policy settings with respect to the subscriber data in a corresponding access configuration record of an access configuration blockchain ledger 114. For example, the access policy settings stored in an access configuration record may limit access for subscriber data of one or more subscribers to certain type of third-party entities, to specific identified third-party entities, to third-party entities in specific geographical areas, specific business sectors, meeting specific business practice requirements, and/or so forth.

At block 306, the data broker platform 104 may receive a data request from a computing device of a third-party entity to access a set of subscriber data of the subscriber. A data request may specify one or more request parameters of a particular set of subscriber data that a third-party entity desires to access. Accordingly, the data broker platform 104 may identify subscriber data of particular subscribers in the subscriber data store 110 that matches the one or more request parameters of the data request.

At block 308, the data broker platform 104 may use one or more records in the subscriber preference blockchain ledger 112 to determine whether the third-party entity is permitted by at least one data sharing preference setting to access the set of subscriber data. For example, the data broker platform 104 may read the subscriber preference blockchain ledger 112 for at least one data sharing preference setting that pertains to the subscriber data of the subscriber. At decision block 310, if the data broker platform 104 determines that access to the set of subscriber data is permitted by the at least one data sharing preference setting ("yes" at decision block 310), the process 300 may proceed to block 312.

At block 312, the data broker platform 104 may determine, using one or more records in the access configuration blockchain ledger 114, whether the third-party entity is permitted by at least one access policy setting to access the set of subscriber data. For example, the data broker platform 104 may read the access configuration blockchain ledger 114 for at least one access configuration setting that pertains to the subscriber data of the subscriber. At decision block 314, if the data broker platform 104 determines that access to the set of subscriber data is permitted by the at least one access policy setting ("yes" at decision block 314), the process 300 may proceed to block 316. At block 316, the data broker platform 104 may provide the computing device of the third-party entity with access to the set of subscriber data. In various embodiments, the set of subscriber data may be encrypted by the data broker platform 104 such that the set is accessible to the third-party entity following a decryption of the set with a valid encryption key provided separately or in advance by the data retrieval module 222.

Returning to decision block 310, if the data broker platform 104 determines that access to the set of subscriber data is not permitted by the at least one data sharing preference setting ("no" at decision block 310), the process 300 may proceed to block 318. At block 318, the data broker platform 104 may provide a notification to the computing device of the third-party entity indicating that access to the set of subscriber data is denied. Returning to decision block 314, if the data broker platform 104 determines that access to the set of subscriber data is not permitted by the at least one access policy setting ("no" at decision block 314), the process may proceed to block 318.

Figure 4:
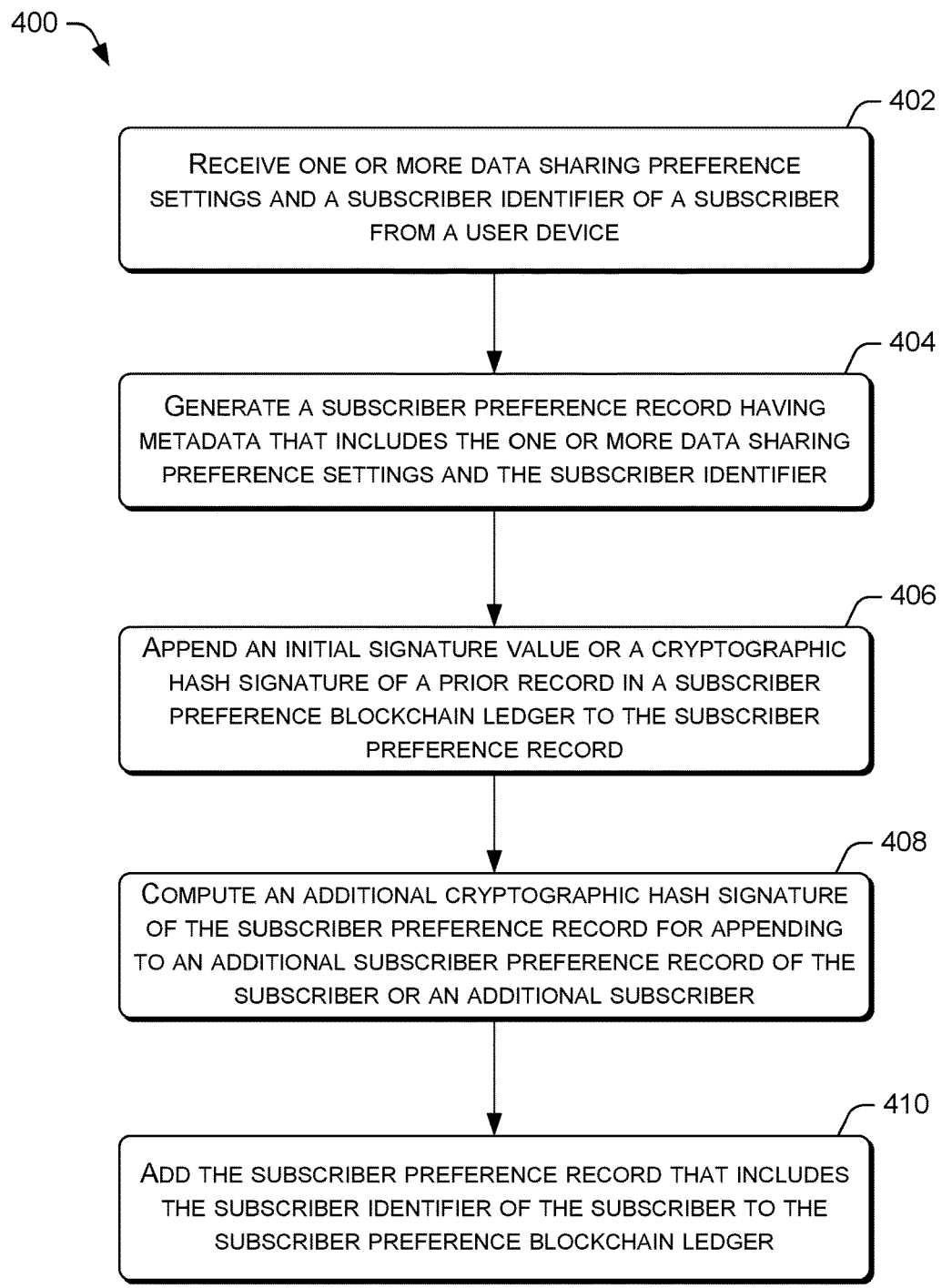
FIG. 4 is a flow diagram of an example process for appending a subscriber preference record that includes one or more data sharing preferences of a subscriber to a subscriber preference blockchain ledger.

FIG. 4 is a flow diagram of an example process 400 for appending a subscriber preference record that includes one or more data sharing preferences of a subscriber to a subscriber preference blockchain ledger 112. The example process 400 further describes block 302 of the example process 300. At block 402, the preference configuration module 216 of the data broker platform 104 may receive one or more data sharing preference settings and a subscriber identifier of a subscriber from a user device. At block 404, the preference configuration module 216 may generate a subscriber preference record having metadata that includes the one or more data sharing preference settings and the subscriber identifier. At block 406, the preference configuration module 216 may append an initial signature value or a cryptographic hash signature of a prior record in the subscriber preference blockchain ledger 112 to the subscriber preference record. The initial signature value may be any unique (e.g., random) value that is generated by the preference configuration module 216.

At block 408, the preference configuration module 216 may compute an additional cryptographic hash signature of the subscriber preference record for appending to an additional subscriber preference record of the subscriber or an additional subscriber. At block 410, the preference configuration module 216 may add the subscriber preference record that includes the subscriber identifier of the subscriber to the subscriber preference blockchain ledger 112.

Figure 5:
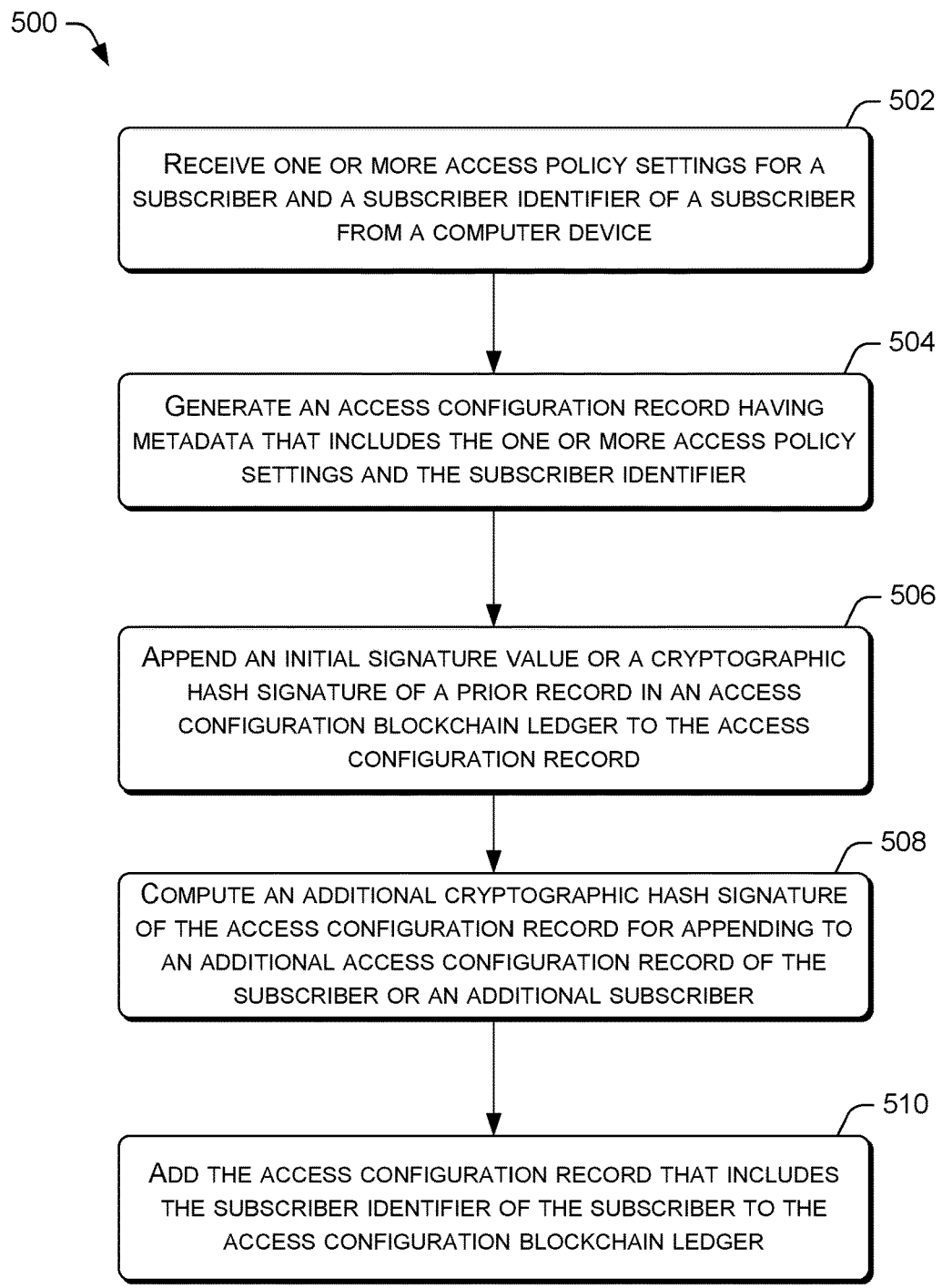
FIG. 5 is a flow diagram of an example process for appending an access configuration record that includes one or more data transaction settings of the MNO to an access configuration blockchain ledger.

FIG. 5 is a flow diagram of an example process 500 for appending an access configuration record that includes one or more data transaction settings of the MNO to an access configuration blockchain ledger. The example process 500 further describes block 304 of the example process 300. At block 502, the access configuration module 218 of the data broker platform 104 may receive one or more access policy settings and a subscriber identifier of a subscriber from a computer device. At block 504, the access configuration module 218 may generate an access configuration record having metadata that includes the one or more access policy settings and the subscriber identifier. At block 506, the access configuration module 218 may append an initial signature value or a cryptographic hash signature of a prior record in the access configuration blockchain ledger 114 to the access configuration record. The initial signature value may be any unique (e.g., random) value that is generated by the access configuration module 218.

At block 508, the access configuration module 218 may compute an additional cryptographic hash signature of the access configuration record for appending to an additional access configuration record of the subscriber or an additional subscriber. At block 510, the access configuration module 218 may add the access configuration record that includes the subscriber identifier of the subscriber to the access configuration blockchain ledger 114.

Figure 6:
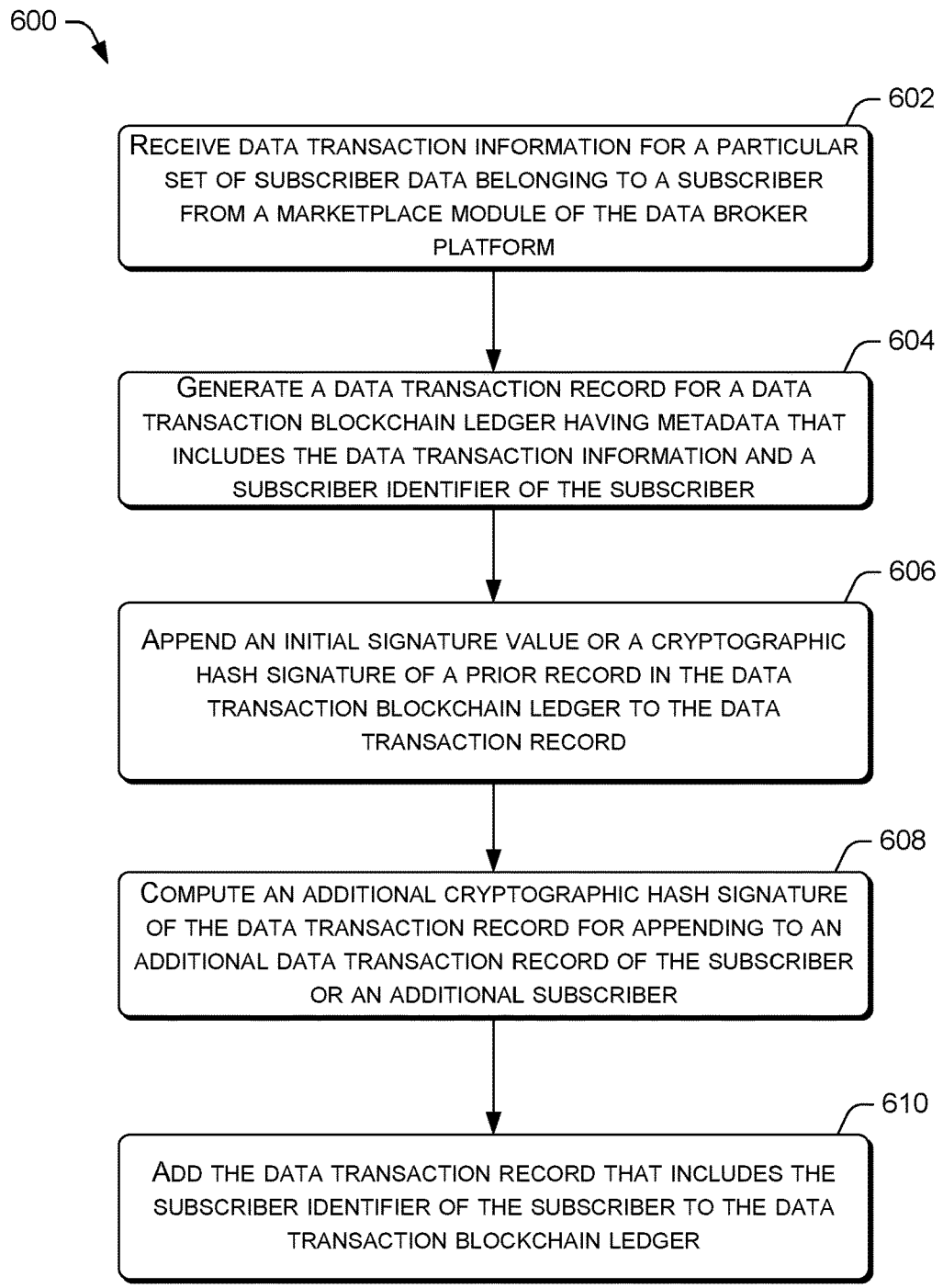
FIG. 6 is a flow diagram of an example process for appending a data transaction record that includes transaction information for a particular set of subscriber data to a data transaction blockchain ledger.

FIG. 6 is a flow diagram of an example process 600 for appending a data transaction record that includes transaction information for a particular set of subscriber data to a data transaction blockchain ledger. At block 602, the data transaction module 220 of the data broker platform 104 may receive data transaction information for a particular set of subscriber data belonging to a subscriber from a marketplace module 228 of the data broker platform 104. For example, the data transaction information stored in a data transaction record for a subscriber data access may indicate an identity of the third-party entity, the time and date of subscriber data access, the identifier of each subscriber to which the accessed subscriber data belongs, the type of the subscriber data that is accessed, the identification information of the subscriber data that is accessed, the type and amount of financial or other compensation provided to each subscriber for the access to the subscriber data, and/or so forth.

At block 604, the data transaction module 220 may generate a data transaction record having metadata that includes the transaction information and a subscriber identifier of the subscriber. At block 606, the data transaction module 220 may append an initial signature value or a cryptographic hash signature of a prior record in the data transaction blockchain ledger 138 to the data transaction record. The initial signature value may be any unique (e.g., random) value that is generated by the data transaction module 220.

At block 608, the data transaction module 220 may compute an additional cryptographic hash signature of the data transaction record for appending to an additional data transaction record of the subscriber or an additional subscriber. At block 610, the data transaction module 220 may add the data transaction record that includes the subscriber identifier of the subscriber to the data transaction blockchain ledger 138.

Figure 7:
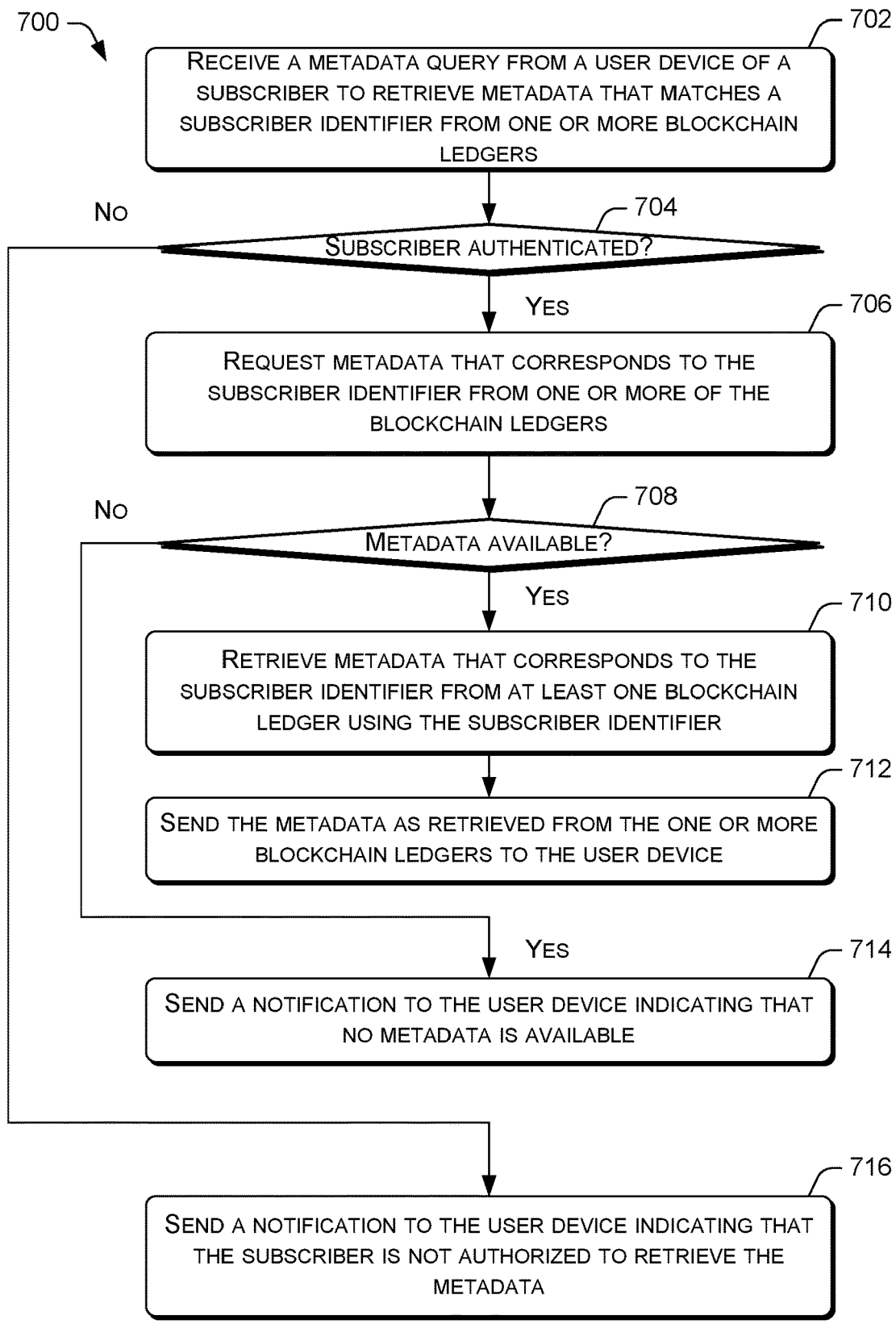
FIG. 7 is a flow diagram of an example process for providing metadata for a subscriber from one or more blockchain ledgers of the MNO in response to a request from the subscriber.

FIG. 7 is a flow diagram of an example process 700 for providing metadata for a subscriber from one or more blockchain ledgers of the MNO in response to a request from the subscriber. At block 702, the metadata query module 224 of the data broker platform 104 may receive a metadata query from a user device of a subscriber to retrieve metadata that matches a subscriber identifier from one or more blockchain ledgers. In various embodiments, the metadata query may be submitted by a client application on the user device through an online query portal to the metadata query module 224. The metadata query may include one or more query parameters, such as an identifier of each blockchain ledger to be queried, the time period to be queried, the type of metadata to be queried, and/or so forth.

At decision block 704, the metadata query module 224 may determine whether the subscriber is authenticated. Thus, if the subscriber is authenticated ("yes" at decision block 704), the process 700 may proceed to block 706. At block 706, the metadata query module 224 may request metadata that corresponds to the subscriber identifier from one or more of the blockchain ledgers. In various embodiments, the blockchain ledgers may include the subscriber preference blockchain ledger 112, the access configuration blockchain ledger 114, and the data transaction blockchain ledger 138.

At decision block 708, if the requested metadata is available ("yes" at decision block 708), the process 700 may proceed to block 710. At block 710, the metadata query module 224 may retrieve metadata that corresponds to the subscriber from at least one blockchain ledger using the subscriber identifier. At block 712, the metadata query module 224 may send the metadata as retrieved from the one or more blockchain ledgers to the user device. In various embodiments, the metadata may be sent to a client application on the user device through the online query portal. Returning to decision block 704, if the subscriber is not authenticated ("no" at decision block 704), the process 700 may proceed to block 716. At block 716, the metadata query module 224 may send a notification to the user device indicating that the subscriber is not authorized to retrieve the metadata. Returning to decision block 708, if the requested metadata is not available ("no" at decision block 708), the process 700 may proceed to block 714. At block 714, the metadata query module 224 may send a notification to the user device indicating that no metadata is available. In alternative embodiments, the metadata query may originate from the computing device of an authorized person rather than from the computing device of the subscriber. In such embodiments, the process 700 may be carried out with respect to the authorized person rather than the subscriber.

Figure 8:
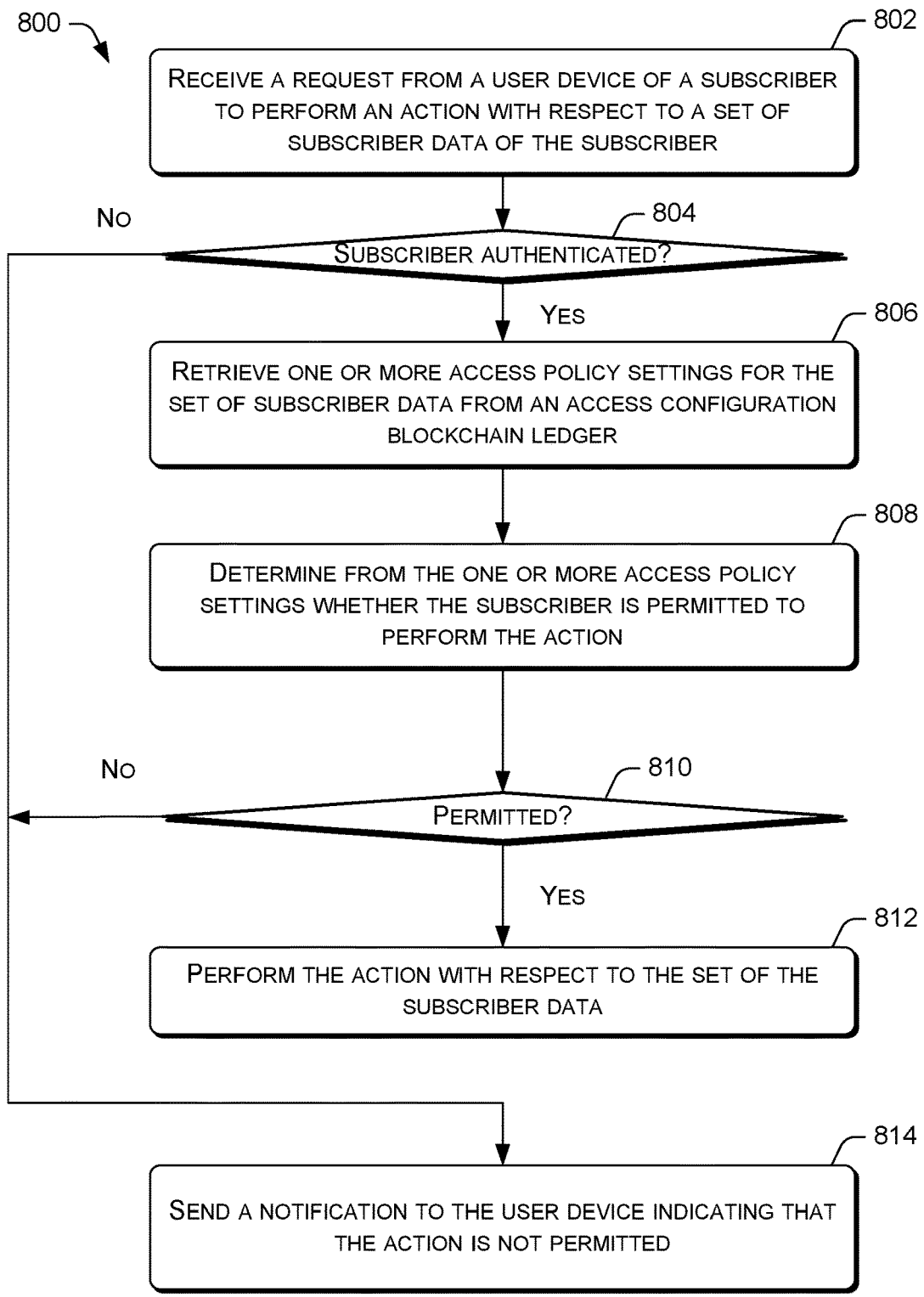
FIG. 8 is a flow diagram of an example process for performing an action with respect to the subscriber data of a subscriber in accordance with one or more data transaction configuration settings for the subscriber in an access configuration blockchain ledger.

FIG. 8 is a flow diagram of an example process 800 for performing an action with respect to the subscriber data of a subscriber in accordance with one or more data transaction configuration settings for the subscriber in an access configuration blockchain ledger.

At block 802, the data operation module 226 of the data broker platform 104 may receive a request from a user device of a subscriber to perform an action with respect to a set of subscriber data of the subscriber. For example, the data operation may involve a deletion or a modification of a set of subscriber data. Accordingly, the operation request may include several parameters, such as a subscriber identifier of the subscriber, the specific data operation to be performed, the identification information for the set of subscriber data for which the operation is to be performed (e.g., information type, time range, collection source, etc.), and/or so forth.

At decision block 804, the data operation module 226 may determine whether the subscriber is authenticated. Thus, if the subscriber is authenticated ("yes" at decision block 804), the process 800 may proceed to block 806. At block 806, the data operation module 226 may retrieve one or more access policy settings for the subscriber data from an access configuration blockchain ledger 114. At block 808, the data operation module 226 may determine from the one or more access policy settings whether the subscriber is permitted to perform the action. At decision block 810, if the subscriber is determined to be permitted to perform the action ("yes" at decision block 810), the process 800 may proceed to block 812. At block 812, the data operation module 226 may perform the action with respect to the set of subscriber data.

Returning to decision block 804, if the subscriber is not authenticated ("yes" at decision block 804), the process 800 may proceed to block 814. At block 814, the data operation module 226 may send a notification to the user device indicating that the action is not permitted. Returning to decision block 810, if the subscriber is determined to be not permitted to perform the action ("no" at decision block 810), the process 800 may also proceed to block 814.

Figure 9:
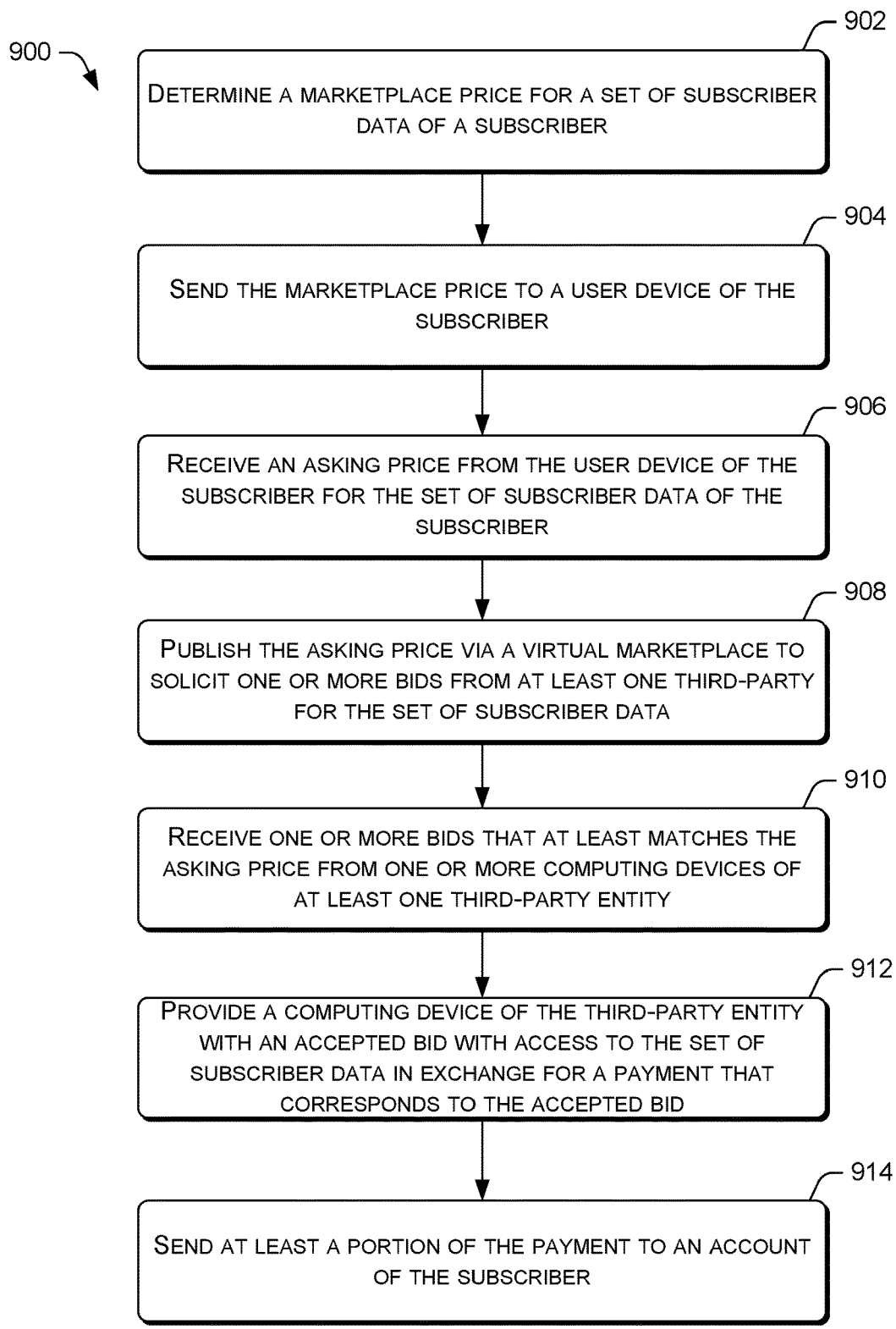
FIG. 9 is a flow diagram of an example process for brokering a third-party access transaction for the subscriber data of a subscriber.

FIG. 9 is a flow diagram of an example process 900 for brokering a third-party access transaction for the subscriber data of a subscriber. At block 902, the marketplace module 228 of the data broker platform 104 may determine a marketplace price for a set of subscriber data of a subscriber. In various embodiments, the determination may be made based on one or more characteristics of the subscriber. For example, the characteristics may include gender, age, occupation, income level, education level, amount of online social influence, payment history with the wireless carrier network 102, and/or so forth.

At block 904, the marketplace module 228 may send the market price to a user device of the subscriber. For example, the market price may be sent to a client application on the user device for viewing by the subscriber. At block 906, the marketplace module 228 may receive an asking price from the user device of the subscriber for the set of subscriber data of the subscriber. The asking price may be a monetary value, a credit value, or some other form of valuation. The asking price that is submitted by the subscriber may be accompanied by bid acceptance instructions.

At block 908, the marketplace module 228 may publish the asking price via a virtual marketplace to solicit one or more bids from at least one third-party entity for the set of subscriber data. At block 910, the marketplace module 228 may receive one or more bids that at least matches the asking price from one or more computing devices of at least one third-party entity. In some instances, the marketplace module 228 may automatically accept a highest bid that is submitted within a predetermined time period. In other instances, the marketplace module 228 may provide a list of the bids to the client application of the subscriber via the online marketplace portal. In this way, the subscriber may select one of the bids in the list for acceptance.

At block 912, the marketplace module 228 may provide a computing device of a third-party entity with an accepted bid with access to the set of subscriber data in exchange for a payment that corresponds to the accepted bid. For example, the marketplace module 228 may send the set of subscriber data to the computing device of the third-party entity. At block 914, the marketplace module 228 may send at least a portion of the payment to an account of the subscriber. For example, the marketplace module 228 may retain a portion of the payment as a service fee for facilitating the transaction. Alternatively, the marketplace module 228 may collect a separate service fee from the third-party entity for facilitating the transaction. The payment that is provided may be in the form of real-world monetary compensation, virtual currency compensation, discounts to products and/or services, statement credit, and/or so forth.

By using these blockchain ledgers, the MNO may ensure that third-party access to subscriber data is always in compliance with the preferences of the subscribers, the internal policies of the MNO, and applicable government regulations. Also, since each data access is recorded in a blockchain ledger that cannot be easily tampered with, a subscriber is always able to access the blockchain ledger to find out with whom and when their data is shared by the MNO. In some cases, the ability to easily access such information may ease the concerns of subscribers and motivate them to provide their data to third-party entities for financial compensation that offsets the cost of their wireless service. Further, the blockchain ledgers can also be audited by both private and governmental regulatory bodies to ensure MNO compliance with privacy obligations and laws.

Conclusion

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. One or more non-transitory computer-readable media of a data broker platform storing computer-executable instructions that upon execution cause one or more processors to perform acts comprising:
   generating an interface of an online preference portal that is configured to receive, via a user device of a subscriber that uses one or more communication services of a mobile network operator (MNO), one or more first, given data sharing preferences for controlling third-party access to subscriber data of the subscriber;
   generating an interface of an online administrative portal that is configured to receive, via an application of a computing device, one or more second, given data access policies for controlling the third-party access to the subscriber data of the subscriber;
   receiving, via the online preference portal, one or more first data sharing preferences and a subscriber identifier of the subscriber;

receiving, via the online administrative portal, one or more second data sharing preferences and the subscriber identifier of the subscriber;

based on receiving the first data sharing preferences via the online preference portal, generating a subscriber preference record comprising metadata that includes the one or more first data sharing preferences and the subscriber identifier;

based on receiving the second data sharing preferences via the online administrative portal, generating an access configuration record comprising metadata that includes one or more access configuration settings and the subscriber identifier;

appending, to the subscriber preference record, a first, unique initial signature value or a cryptographic hash signature of a prior subscriber preference record in a subscriber preference blockchain ledger that is configured to store given sharing preferences (i) provided by given subscribers via the online preference portal and (ii) for given subscriber data;

appending, to the access configuration record, a second, unique initial signature value or a cryptographic hash signature of a prior access configuration record the access configuration blockchain ledger that is configured to store given access policies (i) provided via the online administrative portal and (ii) for given subscriber data;

computing an additional cryptographic hash signature of the subscriber preference record for appending to an additional subscriber preference record of the subscriber or a first additional subscriber;

computing an additional cryptographic hash signature of the access configuration record for appending to an additional access configuration record of the subscriber or a second additional subscriber;

adding the subscriber preference record that includes the subscriber identifier of the subscriber to the subscriber preference blockchain ledger;

adding the access configuration record that includes the subscriber identifier of the subscriber to the access configuration blockchain ledger;

receiving a data request from a computing device of a third-party entity to access a set of subscriber data of the subscriber at an online request portal of the data broker platform;

in response to the data request to access the set of subscriber data, accessing a subscriber preference record in the subscriber preference blockchain ledger;

determining that the third-party entity is permitted to access the set of subscriber data according to the subscriber preference record in the subscriber preference blockchain ledger;

after determining that the third-party entity is permitted to access the set of subscriber data according to the subscriber preference record in the subscriber preference blockchain ledger, accessing an access configuration record in the access configuration blockchain ledger;

after determining that the third-party entity is permitted to access the set of subscriber data according to subscriber preference record in the subscriber preference blockchain ledger, determining that the third-party entity is not permitted to access the set of subscriber data according to the access configuration record in the access configuration blockchain ledger;

after determining that the third-party entity is permitted to access the set of subscriber data according to subscriber preference record in the subscriber preference blockchain ledger and after determining that the third-party entity is not permitted to access the set of subscriber data according to the access configuration record in the access configuration blockchain ledger, determining that the third-party entity is not permitted to access the set of subscriber data; and based on determining that the third-party entity is not permitted to access the set of subscriber data, providing a notification to the computing device of the third-party entity indicating that access to the set of subscriber data is denied.

2. The one or more non-transitory computer-readable media of claim 1, wherein the acts further comprise:

receiving a request from the user device of the subscriber to perform an action with respect to a set of subscriber data of the subscriber, the action includes deleting or modifying the set of subscriber data;

retrieving one or more access policy settings for the set of subscriber data from the access configuration blockchain ledger;

in response to the one or more access policy settings permitting the action, performing the action with respect to the set of subscriber data; and in response to the one or more access policy settings not permitting the action, sending a notification to the user device indicating that the action is not permitted.

3. The one or more non-transitory computer-readable media of claim 1, wherein the acts further comprise:

receiving an additional data request from an additional computing device of an additional third-party entity to access an additional set of subscriber data of the subscriber at the online request portal of the data broker platform;

determining using one or more first corresponding records in the subscriber preference blockchain ledger and one or more second corresponding records in the access configuration blockchain ledger that the additional third-party entity is permitted to access the additional set of subscriber data of the subscriber; and in response to the additional third-party entity being permitted to access the additional set of subscriber data, providing the set of subscriber data to the computing device of the additional third-party entity.

4. The one or more non-transitory computer-readable media of claim 3, wherein the acts further comprise:

receiving a payment from the additional computing device of the additional third-party entity for access to the additional set of subscriber data of the subscriber; and providing, via the data broker platform, at least a portion of the payment to an account of the subscriber for the third-party access to the additional set of subscriber data.

5. The one or more non-transitory computer-readable media of claim 4, wherein the providing includes encrypting the additional set of subscriber data into encrypted subscriber data and sending the encrypted subscriber data to the additional computing device of the additional third-party entity.

6. The one or more non-transitory computer-readable media of claim 3, wherein the acts further comprise:

generating a data transaction record comprising metadata that includes transaction information related to the access of the additional set of subscriber data of the subscriber by the additional third-party entity and a subscriber identifier of the subscriber;

appending a unique initial signature value or a hash signature of a prior data transaction record in a data transaction blockchain ledger to the data transaction record;

computing an additional hash signature of the data transaction record for appending to an additional data transaction record of the subscriber or another subscriber; and adding the data transaction record that includes the subscriber identifier of the subscriber to the data transaction blockchain ledger.

7. The one or more non-transitory computer-readable media of claim 1, wherein the acts further comprise:

receiving a request from an additional user device of a user to retrieve metadata that matches a subscriber identifier of the subscriber from one or more blockchain ledgers;

retrieving corresponding metadata from at least one blockchain ledger using the subscriber identifier; and sending the corresponding metadata that corresponds to the subscriber identifier to the user device, wherein the user is the subscriber or another person authorized to access the metadata.

8. A computer-implemented method, comprising:

storing, via one or more computing nodes, one or more data sharing preference settings for subscriber data of a subscriber in a corresponding subscriber preference record of a subscriber preference blockchain ledger based on the one or more data sharing preferences being inputted via an online preference portal of a mobile network operator (MNO) for controlling third-party access to the subscriber data of the subscriber;

storing, via the one or more computing nodes, one more access policy settings with respect to the subscriber data in a corresponding access configuration record of an access configuration blockchain ledger based on the one or more access policy settings being inputted via an online preference portal of the MNO for controlling third-party access to the subscriber data of the subscriber;

receiving, via the one or more computing nodes, a first data request from a first computing device of a first third-party entity of the third-party entities to access a first set of subscriber data of the subscriber;

in response to the first data request to access the first set of subscriber data, accessing one or more first subscriber preference records in the subscriber preference blockchain ledger;

determining that the first third-party entity is permitted to access the first set of subscriber data according to the one or more first subscriber preference records in the subscriber preference blockchain ledger;

after determining that the first third-party entity is permitted to access the first set of subscriber data according to the one or more first subscriber preference records in the subscriber preference blockchain ledger, accessing one or more first access configuration records in the access configuration blockchain ledger;

after determining that the first third-party entity is permitted to access the first set of subscriber data according to the one or more first subscriber preference records in the subscriber preference blockchain ledger, determining that the first third-party entity is not permitted to access the first set of subscriber data according to the one or more first access configuration records in the access configuration blockchain ledger;

after determining that the first third-party entity is permitted to access the first set of subscriber data according to the one or more first subscriber preference records in the subscriber preference blockchain ledger and after determining that the first third-party entity is not permitted to access the first set of subscriber data according to the one or more first access configuration records in the access configuration blockchain ledger determining that the first third-party entity is not permitted to access the first set of subscriber data; and based on determining that the first third-party entity is not permitted to access the first set of subscriber data, providing a notification to the computing device of the third-party entity indicating that access to the set of subscriber data is denied;

receiving, via the one or more computing nodes, a second data request from a second computing device of a second third-party entity of the third-party entities to access a second set of subscriber data of the subscriber;

determining, via the one or more computing nodes, using one or more second subscriber preference records in the subscriber preference blockchain ledger that the second third-party entity is permitted to access the second set of subscriber data;

determining, via the one or more computing nodes, using one or more second access configuration records in the access configuration blockchain ledger that the second third-party entity is permitted to access the second set of subscriber data;

in response to the determining that the second third-party entity is permitted to access the second set of subscriber data by the subscriber preference blockchain ledger and the access configuration blockchain ledger, providing the second computing device of the second third-party entity with access to the second set of subscriber data;

in response to providing the second computing device of the second third-party entity with access to the second set of subscriber data, generating a data transaction record for a data transaction blockchain ledger, the data transaction record comprising metadata that includes transaction information related to the access of the second set of subscriber data of the subscriber by the second third-party entity and a subscriber identifier of the subscriber, the transaction information including an identity of the second third-party entity that accessed the second set of subscriber data and time and date of the access to the set of subscriber data of the subscriber;

appending a unique initial signature value or a hash signature of a prior data transaction record in the data transaction blockchain ledger to the data transaction record;

computing an additional hash signature of the data transaction record for appending to an additional data transaction record of the subscriber or an additional subscriber; and adding the data transaction record that includes the subscriber identifier of the subscriber to the data transaction blockchain ledger.

9. The computer-implemented method of claim 8, further comprising:

receiving one or more data sharing preferences and a subscriber identifier of a subscriber that uses one or more communication services of the MNO from a user device of the subscriber, the one or more data sharing preferences controlling third-party access to subscriber data of the subscriber;

generating a subscriber preference record comprising metadata that includes the one or more data sharing preferences and the subscriber identifier;

appending a unique initial signature value or a cryptographic hash signature of a prior subscriber preference record in the subscriber preference blockchain ledger to the subscriber preference record;

computing an additional cryptographic hash signature of the subscriber preference record for appending to an additional subscriber preference record of the subscriber or an additional subscriber; and adding the subscriber preference record that includes the subscriber identifier of the subscriber to the subscriber preference blockchain ledger.

10. The computer-implemented method of claim 8, further comprising:

receiving one or more access configuration settings for a subscriber and a subscriber identifier of the subscriber from a computer device, the one or more data sharing preferences further controlling third-party access to the subscriber data of the subscriber;

generating an access configuration record comprising metadata that includes one or more access configuration settings and the subscriber identifier;

appending a unique initial signature value or a hash signature of a prior access configuration record in the access configuration blockchain ledger to the access configuration record;

computing an additional hash signature of the access configuration record for appending to an additional access configuration record of the subscriber or an additional subscriber; and adding the access configuration record that includes the subscriber identifier of the subscriber to the access configuration blockchain ledger.

11. The computer-implemented method of claim 8, further comprising:

receiving a request from a user device of a subscriber to perform an action with respect to the set of subscriber data of the subscriber, the action includes deleting or modifying the set of subscriber data;

retrieving one or more access policy settings for the set of subscriber data from the access configuration blockchain ledger;

in response to the one or more access policy settings permitting the action, performing the action with respect to the set of subscriber data; and in response to the one or more access policy settings not permitting the action, sending a notification to the user device indicating that the action is not permitted.

12. The computer-implemented method of claim 8, further comprising:

receiving a payment from the computing device of the second third-party entity for access to the second set of subscriber data of the subscriber; and providing at least a portion of the payment to an account of the subscriber for the access by the second third-party to the second set of subscriber data.

13. The computer-implemented method of claim 8, further comprising:

receiving a request from a user device of a user to retrieve metadata that matches a subscriber identifier of the subscriber from one or more blockchain ledgers;

retrieving corresponding metadata from at least one blockchain ledger using the subscriber identifier; and sending the corresponding metadata that corresponds to the subscriber identifier to the user device, wherein the user is the subscriber or another person authorized to access the metadata.

14. The computer-implemented method of claim 8, further comprising:

sending a marketplace price that is determined for a set of subscriber data of a subscriber to a user device of a subscriber;

receiving an asking price from the user device of the subscriber for the set of subscriber data of the subscriber;

publishing the asking price via a virtual marketplace to solicit one or more bids from at least one third-party for the set of subscriber data of the subscriber;

receiving one or more bids that at least matches the asking price from one or more computing devices of at least one third-party entity; and providing a computing device of the third-party entity with an accepted bid with access to the set of subscriber data in exchange for a payment that corresponds to the accepted bid.

15. The computer-implemented method of claim 14, further comprising sending at least a portion of the payment to an account of subscriber.

16. A system, comprising:

one or more processors; and memory including a plurality of computer-executable components that are executable by the one or more processors to perform a plurality of actions, the plurality of actions comprising:

storing, via one or more computing nodes, one or more data sharing preference settings for subscriber data of a subscriber in a corresponding subscriber preference record of a subscriber preference blockchain ledger based on the one or more data sharing preferences being inputted via an online preference portal of a mobile network operator (MNO) for controlling third-party access to the subscriber data of the subscriber;

storing, via the one or more computing nodes, one more access policy settings with respect to the subscriber data in a corresponding access configuration record of an access configuration blockchain ledger based on the one or more access policy settings being inputted via an online preference portal of the MNO for controlling third-party access to the subscriber data of the subscriber;

receiving, via the one or more computing nodes, a first data request from a first computing device of a first third-party entity of the third-party entities to access a first set of subscriber data of the subscriber;

in response to the first data request to access the first set of subscriber data, accessing one or more first subscriber preference records in the subscriber preference blockchain ledger;

determining that the first third-party entity is permitted to access the first set of subscriber data according to the one or more first subscriber preference records in the subscriber preference blockchain ledger;

after determining that the first third-party entity is permitted to access the first set of subscriber data according to the one or more first subscriber preference records in the subscriber preference blockchain ledger, accessing one or more first access configuration records in the access configuration blockchain ledger;

after determining that the first third-party entity is permitted to access the first set of subscriber data according to the one or more first subscriber preference records in the subscriber preference blockchain ledger, determining that the first third-party entity is not permitted to access the first set of subscriber data according to the one or more first access configuration records in the access configuration blockchain ledger;

after determining that the first third-party entity is permitted to access the first set of subscriber data according to the one or more first subscriber preference records in the subscriber preference blockchain ledger and after determining that the first third-party entity is not permitted to access the first set of subscriber data according to the one or more first access configuration records in the access configuration blockchain ledger determining that the first third-party entity is not permitted to access the first set of subscriber data; and based on determining that the first third-party entity is not permitted to access the first set of subscriber data, providing a notification to the computing device of the third-party entity indicating that access to the set of subscriber data is denied;

receiving, via the one or more computing nodes, a second data request from a second computing device of a second third-party entity of the third-party entities to access a second set of subscriber data of the subscriber;

determining, via the one or more computing nodes, using one or more second subscriber preference records in the subscriber preference blockchain ledger that the second third-party entity is permitted to access the second set of subscriber data;

determining, via the one or more computing nodes, using one or more second access configuration records in the access configuration blockchain ledger that the second third-party entity is permitted to access the second set of subscriber data;

in response to the determining that the second third-party entity is permitted to access the second set of subscriber data by the subscriber preference blockchain ledger and the access configuration blockchain ledger, providing the second computing device of the second third-party entity with access to the second set of subscriber data;

in response to providing the second computing device of the second third-party entity with access to the second set of subscriber data, generating a data transaction record for a data transaction blockchain ledger, the data transaction record comprising metadata that includes transaction information related to the access of the second set of subscriber data of the subscriber by the second third-party entity and a subscriber identifier of the subscriber, the transaction information including an identity of the second third-party entity that accessed the second set of subscriber data and time and date of the access to the set of subscriber data of the subscriber;

appending a unique initial signature value or a hash signature of a prior data transaction record in the data transaction blockchain ledger to the data transaction record;

computing an additional hash signature of the data transaction record for appending to an additional data transaction record of the subscriber or an additional subscriber; and adding the data transaction record that includes the subscriber identifier of the subscriber to the data transaction blockchain ledger.

17. The system of claim 16, wherein the plurality of actions further comprise:

receiving one or more data sharing preferences and a subscriber identifier of a subscriber that uses one or more communication services of the MNO from a user device of the subscriber, the one or more data sharing preferences controlling third-party access to subscriber data of the subscriber;

generating a subscriber preference record comprising metadata that includes the one or more data sharing preferences and the subscriber identifier;

appending a unique initial signature value or a cryptographic hash signature of a prior subscriber preference record in the subscriber preference blockchain ledger to the subscriber preference record;

computing an additional cryptographic hash signature of the subscriber preference record for appending to an additional subscriber preference record of the subscriber or an additional subscriber; and adding the subscriber preference record that includes the subscriber identifier of the subscriber to the subscriber preference blockchain ledger.

18. The system of claim 16, wherein the plurality of actions further comprise:

receiving one or more access configuration settings for a subscriber and a subscriber identifier of the subscriber from a computer device, the one or more data sharing preferences further controlling third-party access to the subscriber data of the subscriber;

generating an access configuration record comprising metadata that includes one or more access configuration settings and the subscriber identifier;

appending a unique initial signature value or a hash signature of a prior access configuration record in the access configuration blockchain ledger to the access configuration record;

computing an additional hash signature of the access configuration record for appending to an additional access configuration record of the subscriber or an additional subscriber; and adding the access configuration record that includes the subscriber identifier of the subscriber to the access configuration blockchain ledger.

* * * * *